(12) United States Patent
Sevindik et al.

(10) Patent No.: US 12,389,433 B2
(45) Date of Patent: *Aug. 12, 2025

(54) METHODS AND APPARATUS FOR MANAGING DOWNLINK CHANNELS AND/OR BANDWIDTH IN WIRELESS SYSTEMS

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,180

(22) Filed: Dec. 5, 2023

(65) Prior Publication Data

US 2024/0107566 A1 Mar. 28, 2024

Related U.S. Application Data

(63) Continuation of application No. 16/938,960, filed on Jul. 25, 2020, now Pat. No. 11,844,098.

(51) Int. Cl.
*H04W 72/52* (2023.01)
*H04W 28/02* (2009.01)
(Continued)

(52) U.S. Cl.
CPC ....... *H04W 72/52* (2023.01); *H04W 28/0252* (2013.01); *H04W 72/23* (2023.01); *H04W 84/12* (2013.01)

(58) Field of Classification Search
CPC .......... H04W 72/042; H04W 72/0486; H04W 28/0252
See application file for complete search history.

(56) References Cited

U.S. PATENT DOCUMENTS

2006/0109799 A1* 5/2006 Tseng .................... H04W 28/18
370/254
2015/0009952 A1* 1/2015 Berggren .............. H04L 1/1854
370/330

(Continued)

*Primary Examiner* — Charles C Jiang
*Assistant Examiner* — Ryan C Kavleski
(74) *Attorney, Agent, or Firm* — Straub & Straub; Stephen T. Straub; Michael P. Straub

(57) ABSTRACT

The present invention is directed to methods and apparatus for managing downlink channels and/or bandwidth in wireless systems. An exemplary method wireless communications method embodiments includes the steps of: monitoring, by a wireless base station, a downlink channel utilization rate of data transmissions from the wireless base station to a first customer premises equipment (CPE) device on a downlink shared channel to detect a first condition; and upon detecting, by the wireless base station, that the first condition exists, switching from operating in a first wireless base station mode of operation to operating in a second wireless base station mode of operation, said switching from operating in a first mode of operation to operating in a second mode of operation including switching from using a downlink control channel for transmitting downlink control information to the first CPE device to using the downlink control channel for transmitting user data.

20 Claims, 19 Drawing Sheets

(51) Int. Cl.
*H04W 72/23* (2023.01)
*H04W 84/12* (2009.01)

(56) References Cited

U.S. PATENT DOCUMENTS

2020/0187117 A1* 6/2020 Papasakellariou .... H04W 72/23
2021/0194655 A1* 6/2021 Björnson .............. H04L 5/0053

* cited by examiner

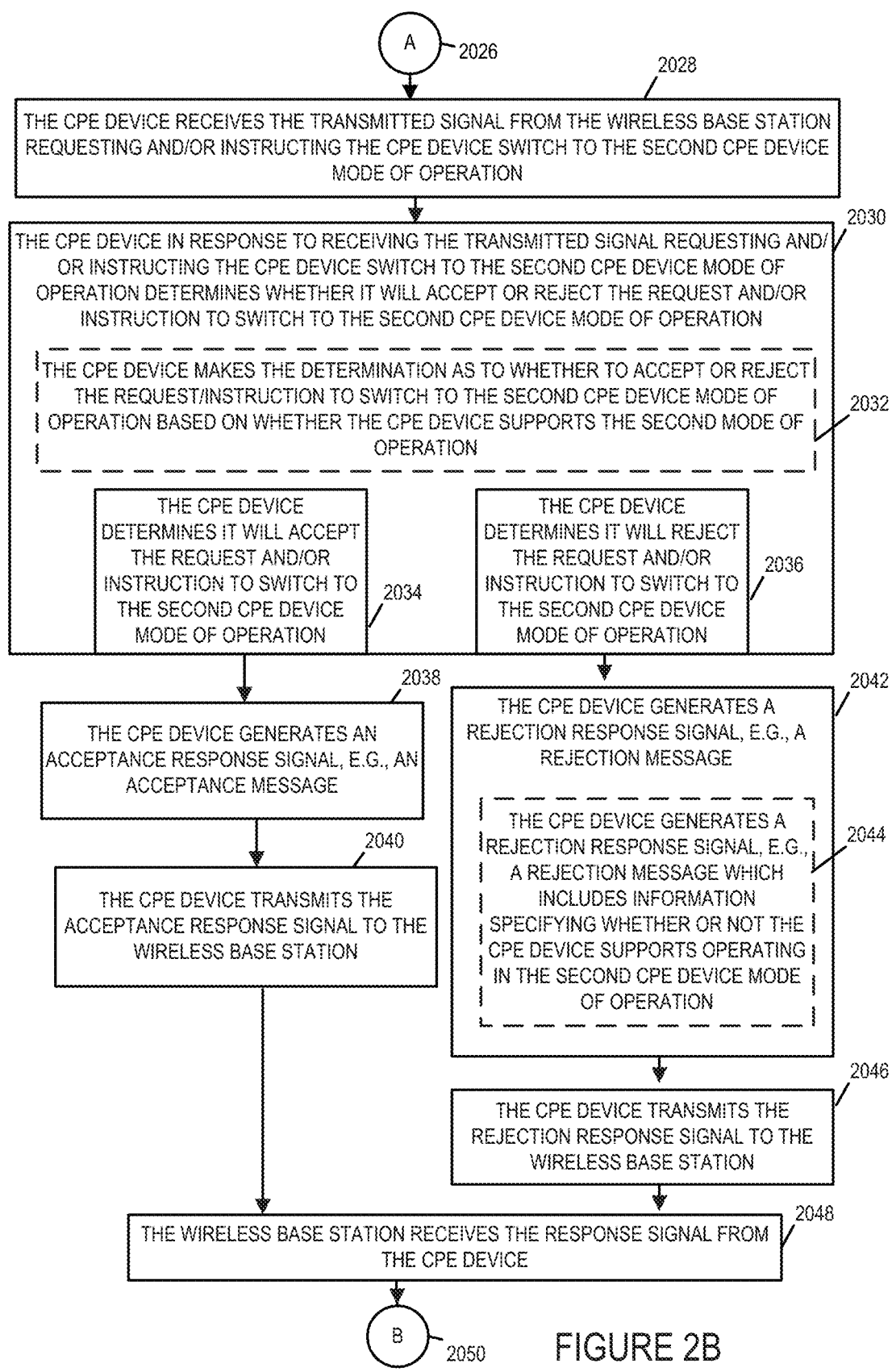

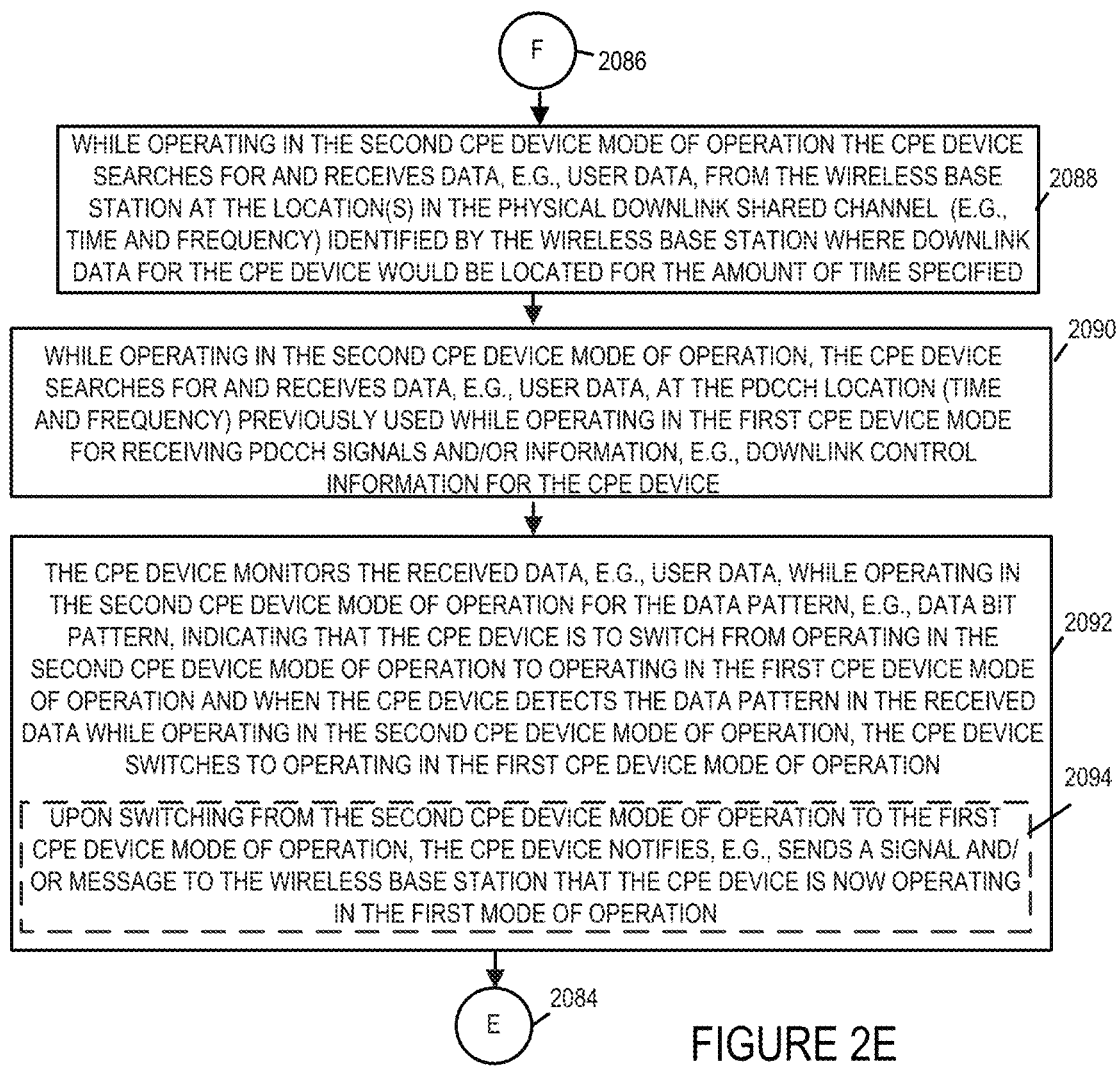

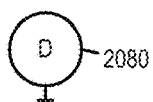

FIGURE 2F

2130 RECEIVE, BY THE WIRELESS BASE STATION, THE NOTIFICATION THAT THE CPE DEVICE IS NOW OPERATING IN THE SECOND CPE DEVICE MODE OF OPERATION

2132 THE WIRELESS BASE STATION SWITCHES FROM OPERATING IN THE FIRST WIRELESS BASE STATION MODE OF OPERATION TO OPERATING IN THE SECOND WIRELESS BASE STATION MODE OF OPERATION

2134 UPON SWITCHING TO THE SECOND WIRELESS BASE STATION MODE OF OPERATION, THE WIRELESS BASE STATION STARTS A COUNT DOWN TIMER WITH THE AMOUNT OF TIME THAT THE WIRELESS BASE STATION INDICATED TO THE CPE DEVICE IT WILL NOT TRANSMIT PDCCH SIGNALS/INFORMATION TO THE CPE DEVICE UPON THE EXPIRATION OF THE TIMER THE WIRELESS BASE STATION WILL SWITCH BACK TO OPERATING IN THE FIRST WIRELESS BASE STATION MODE OF OPERATION

2136 WHILE OPERATING IN THE SECOND WIRELESS BASE STATION MODE OF OPERATION THE WIRELESS BASE STATION STOPS AND/OR REFRAINS FROM SENDING PDCCH SIGNALS/ INFORMATION, E.G., DOWNLINK CONTROL INFORMATION, IN THE PHYSICAL DOWNLINK CONTROL CHANNEL TO THE CPE DEVICE

2138 WHILE OPERATING IN THE SECOND WIRELESS BASE STATION MODE OF OPERATION, THE WIRELESS BASE STATION TRANSMITS DATA, E.G., USER DATA, TO THE CPE DEVICE IN THE PHYSICAL DOWNLINK SHARED CHANNEL AT A FIXED LOCATION (TIME AND FREQUENCY), THE FIXED LOCATION BEING THE LOCATION SPECIFIED BY THE WIRELESS BASE STATION IN THE INFORMATION TRANSMITTED TO THE CPE DEVICE

2140 WHILE OPERATING IN THE SECOND WIRELESS BASE STATION MODE OF OPERATION, THE WIRELESS BASE STATION TRANSMITS DATA, E.G., USER DATA, IN THE PHYSICAL DOWNLINK CONTROL CHANNEL INSTEAD OF PDCCH SIGNALS/INFORMATION TO THE CPE DEVICE, E.G., THE PDCCH LOCATIONS MAY BE USED TO SEND DATA THE CPE DEVICE AND/OR OTHER CPE DEVICE(S)

2142 WHILE OPERATING IN THE SECOND WIRELESS BASE STATION MODE OF OPERATION, THE WIRELESS BASE STATION MONITORS THE DOWNLINK CHANNEL UTILIZATION RATE FOR THE CPE DEVICE TO DETECT IF A SECOND CONDITION EXISTS

2144 IF AND/OR WHEN THE WIRELESS BASE STATION DETECTS WHILE OPERATING IN THE SECOND WIRELESS BASE STATION MODE OF OPERATION BASED ON THE MONITORING OF THE DOWNLINK CHANNEL UTILIZATION RATE FOR THE CPE DEVICE THAT THE SECOND CONDITION EXISTS, THEN THE WIRELESS BASE STATION: (I) TRANSMITS TO THE CPE DEVICE THE DATA PATTERN, E.G., DATA BIT PATTERN, INDICATING THAT THE CPE DEVICE IS TO SWITCH FROM OPERATING IN THE SECOND CPE DEVICE MODE OF OPERATION TO OPERATING IN THE FIRST CPE DEVICE MODE OF OPERATION; AND (II) THE WIRELESS BASE STATION SWITCHES FROM OPERATING IN THE SECOND WIRELESS BASE STATION MODE OF OPERATION TO OPERATING IN THE FIRST WIRELESS BASE STATION MODE OF OPERATION

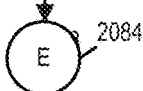

| CPE DEVICE ID | SUPPORTS NO-PDCCH MODE OF OPERATION | CURRENT MODE OF OPERATION | AMOUNT OF TIME UNTIL SWITCH BACK TO PDCCH MODE OF OPERATION | CURRENT DOWNLINK CHANNEL UTILIZATION RATE | AMOUNT OF TIME DOWNLINK CHANNEL UTILIZATION RATE ABOVE A FIRST THRESHOLD VALUE |
|---|---|---|---|---|---|
| CPE DEVICE 1 | Y | NO PDCCH | 5 MINUTES | 100% | 3 hrs |
| CPE DEVICE 2 | Y | NO PDCCH | 7 MINUTES | 95% | 4 hrs |
| CPE DEVICE 3 | Y | PDCCH | 0 MINUTES | 25% | 0 hrs |
| CPE DEVICE 4 | N | PDCCH | 0 MINUTES | 96% | 5 hrs |

FIGURE 12

| CPE DEVICE ID | SUPPORTS NO-PDCCH MODE OF OPERATION | CURRENT MODE OF OPERATION | AMOUNT OF TIME UNTIL SWITCH BACK TO PDCCH MODE OF OPERATION | CURRENT DOWNLINK CHANNEL UTILIZATION RATE | AMOUNT OF TIME DOWNLINK CHANNEL UTILIZATION RATE ABOVE A FIRST THRESHOLD VALUE |
|---|---|---|---|---|---|
| CPE DEVICE 1 | Y | NO PDCCH | 5 MINUTES | 100% | 3 hrs |
| CPE DEVICE 2 | Y | NO PDCCH | 5 MINUTES | 95% | 4 hrs |
| CPE DEVICE 3 | Y | NO PDCCH | 5 MINUTES | 91% | 3.5 hrs |
| CPE DEVICE 4 | Y | NO PDCCH | 5 MINUTES | 96% | 5 hrs |

FIGURE 13

DATA PATTERN

METHODS AND APPARATUS FOR MANAGING DOWNLINK CHANNELS AND/OR BANDWIDTH IN WIRELESS SYSTEMS

RELATED APPLICATIONS

The present application is a continuation of U.S. patent application Ser. No. 16/938,960 which was filed on Jul. 25, 2020 and which published as United States Patent Application Publication No.: US 2022-0030594 A1 on Jan. 27, 2022 and which is hereby expressly incorporated by reference in its entirety.

FIELD OF INVENTION

The present invention relates to methods and apparatus for efficiently providing wireless services to devices for example customer premises equipment devices located at a customer premises. More particularly, the present invention relates to methods and apparatus for managing the use of channels and/or bandwidth to provide downlink control signals and data, e.g., user data, to customer premises equipment devices. The present invention further relates to methods and apparatus for managing by wireless base stations downlink control channels and downlink shared data channels to provide downlink control information and user data to customer premises equipment devices located at fixed positions on customers premises and providing backhaul services to one or more user devices located at the premises.

BACKGROUND OF THE INVENTION

In a Citizens Broadband Radio Service (CBRS) network, Citizens Broadband Radio Service Devices (CBSDs) serve as access points which can support wireless communications with customer premises equipment devices supporting user equipment devices and/or user equipment devices (UEs).

A CBRS network includes a plurality of CBSD devices. The CBSD devices provide wireless services to subscribers' user equipment devices. Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network.

Many customer premises, e.g., homes, do not have landline connections or landline connections which can support broadband services. For example, in various geographical areas, e.g., rural areas of the country with sparse populations, it is not economical or practical to connect landlines to all customer premises. In such areas, there is a need for providing services, e.g., broadband services, to the customer premises which do not have landline connections or do not have landline connections which can provide broadband services. Additionally, in urban areas where landline connections can provide broadband services customers may still desire to have services provided via wireless connections in place of or in addition to landline connections. For example, universities, businesses, hospitals, hotels, etc. may desire to provide broadband or other types of wireless services throughout their customer premises and/or buildings using Wi-FI wireless connections through which users can connect therein being in a position to manage the wireless services provided.

In some CBRS systems sometimes referred to as fixed wireless access systems the wireless services are provided to a plurality of devices at the customer premises, e.g., user equipment devices, using a customer premise equipment device that provides WI-FI services at the customer premises, the customer premises equipment devices then communicating to a wireless base station sometimes referred to as a fixed wireless access tower base station, e.g., a CBS D. The customer premises equipment devices are located at fixed network locations and attached to or include antennas. The antennas are typically mounted at an elevated fixed location such as on the top of a building or attached to pole on the customer premises so as to avoid obstacles that may inhibit the ability of the customer premises equipment device to be able to communicate with its wireless base station, e.g., CBSD device.

While in normal Long Term Evolution (LTE) wireless network operation and 5G wireless network operation, the wireless base station uses a Physical Downlink Control Channel (PDCCH) to communicate downlink control information to user equipment devices and a Physical Downlink Shared Channel (PDSCH) to communicate data, e.g., user data to user equipment devices. European Telecommunications Standards Institute (ETSI) Technical Specification 5G; NR; Physical layer procedures for control (3GPP TS 38.213 version 15.3.0 Release 15) and the ETSI Technical Specification 5G; NR; Physical layer procedures for data (3GPP TS 38.214 version 15.2.0 Release 15) discuss details of the use of PDCCH and PDSCH channels for communicating downlink control information and user data to user devices in 5G new radio. At a high level, the Physical Downlink Control Channel (PDCCH) is used as a pointer to show the location of the Physical Downlink Shared Channel resources for the user equipment device in a resource grid (e.g., a time and frequency resource map). The Physical Downlink Shared Channel carries the actual user data for the user equipment devices being serviced by the wireless base station. As the user terminals are typically mobile terminals they are not at fixed positions. Under mobility scenarios and for scenarios with user equipment providing services to a single user, this method is useful because a user equipment device is not active all the time, the type of traffic consumed changes frequently, the location of the user equipment device changes frequently which changes the radio frequency channel dynamics.

However, for fixed wireless access systems, where a customer premises equipment device is almost always active, there is typically a fixed amount of downlink traffic, e.g., user data, going to the customer premises equipment device for a very high percentage of time. The CPE devices are not mobile and typically provide services for a plurality of devices at the customer premises location. As a result, the PDCCH channel bandwidth is not being efficiently utilized and additional processing is being required at both the wireless base station to generate and send downlink control information and the CPE devices in connection with searching for, receiving and processing downlink control information to identify where in the PDSCH channel its user data is located.

From the above it should be understood that there is a need for new and/or improved methods and apparatus for providing services to customer premises equipment devices in wireless systems. There is a further need for new and/or improved methods and apparatus for managing downlink channels and/or spectrum/bandwidth utilized to communicate data to customer premises equipment devices in a more efficient and/or effective manner. There is a further need for new and/or improved methods and apparatus for decreasing the processing required for generating and sending downlink control information from wireless base stations to customer premises equipment devices. There is a further need for new and/or improved methods and apparatus for reducing the processing associated with receiving downlink control information.

In wireless systems such as for example, 5G and CBRS wireless systems, wherein the objective is to maximize the usage/efficiency of the frequency spectrum there is a need for new and/or improved methods and apparatus to solve the technological problem of how to efficiently and effectively manage the use of spectrum, bandwidth, and/or channels used for communicating control information and data, e.g., user data, from wireless base stations to customer premises equipment devices.

SUMMARY OF THE INVENTION

The present invention provides a technological solution of how to manage the use of downlink channels and/or spectrum and/or bandwidth in wireless networks to efficiently and effectively provide services to devices, e.g., CPE devices, from wireless base stations. The present invention provides technological solutions that increase the usage of downlink channels to the provide data, e.g., user data, to customer premises equipment devices. Various embodiments of the present invention include novel methods and apparatus to solve one or more of the problems identified above.

By using one or more of the techniques described herein a wireless base station can efficiently and effectively manage the use of downlink spectrum and/or channels and/or bandwidth to provide services to customer premises equipment devices. The customer premises equipment devices being devices typically located at a fixed position at a customer's premises and that provides services for one or more user equipment devices, e.g., via a Wi-Fi network at the customer premises at which the customer premises equipment device is located. The present invention also provides new and/or improved techniques for wireless base stations to communicate downlink control information and data, e.g., user data, to customer premises equipment devices in fixed wireless access networks.

An exemplary wireless communications method embodiment in accordance with the present invention includes the steps of: monitoring, by a wireless base station, a downlink channel utilization rate of data transmissions from the wireless base station to a first customer premises equipment (CPE) device on a downlink shared channel to detect a first condition; and upon detecting, by the wireless base station, that the first condition exists, switching from operating in a first wireless base station mode of operation to operating in a second wireless base station mode of operation, said switching from operating in a first wireless base station mode of operation to operating in a second wireless base station mode of operation including switching from using a downlink control channel for transmitting downlink control information to the first customer premises equipment device to using the downlink control channel for transmitting user data.

In some embodiments, the step of detecting, by the wireless base station, that the first condition exists includes determining that downlink channel utilization rate of data transmissions from the wireless base station to the first CPE device exceeds a first threshold value for a predetermined continuous time interval (e.g., 240 minutes).

In some embodiments, the downlink shared channel is a physical downlink shared channel used for communicating data, e.g., user data, from the wireless base station to a plurality of customer premises equipment devices to which the wireless base station is providing services, said first customer premises equipment device being one of said plurality of customer premises equipment devices.

In some embodiments, the downlink control channel is a physical downlink control channel used for communicating customer premises equipment downlink control information from the wireless base station to the plurality of customer premises equipment devices when said first wireless base station is operating in the first wireless base station mode of operation with respect to the plurality of customer premises equipment devices, said physical downlink control channel being a separate physical channel from the physical downlink shared channel.

In some embodiments, the customer premises equipment downlink control information includes a set of customer premises equipment device data location assignments, each customer premises equipment device data location assignment providing location information for a different customer premises equipment device that identifies where in the physical downlink shared channel data communicated from the wireless base station to that particular customer premises equipment device is located. In some such embodiments, the location information includes a time and a frequency for each CPE device being serviced by the wireless base station identifying where the data (e.g., user data) for the CPE device can be located in the physical downlink shared channel.

In some embodiments, the wireless base station is a Citizens Broadband Radio Service tower base station; the plurality of customer premises equipment devices includes the first customer premises equipment device; the first customer premises equipment device being located at a first customer premises and providing services to a first plurality of user equipment devices located at the first customer premises; the first plurality of user equipment devices are Wi-Fi devices; and the first customer premises equipment device includes a first communications interface for communicating with the wireless base station and a second communications interface for communicating with the first plurality of user equipment devices.

In some embodiments, the wireless communications method further includes the step of prior to the wireless base station switching to the second wireless base station mode of operation, communicating from the wireless base station to the first CPE device a first amount of time during which the first CPE device is not to search for downlink control information directed to the first CPE device in the downlink control channel.

In some embodiments, the wireless communications method further includes the step of prior to the wireless base station switching to the second wireless base station mode of operation, communicating from the wireless base station to the first CPE device location information identifying a fixed location in the downlink shared channel where data communicated from the wireless base station to the first CPE device will be located. In some such embodiments, the location information identifying a fixed location in the downlink shared channel where data communicated from the wireless base station to the first CPE device will be located includes time and frequency information mapping to a location in the downlink shared channel for communicating data to the first CPE device.

In some embodiments of the wireless communications method, the method further includes the steps of: operating by the wireless base station a timer; and when the timer indicates that a first amount of time has passed since the wireless base station switched from operating in the first wireless base station mode of operation to operating in the second wireless base station mode of operation, switching by the wireless base station from operating in the second wireless base station mode of operation to operating in first wireless base station mode of operation, said switching from operating in a second wireless base station mode of operation to operating in the first wireless base station mode of operation including switching to using the downlink control channel for transmitting downlink control information to the first customer premises equipment device from the downlink control channel being used to transmit user data.

In some embodiments, the wireless communications method further includes prior to the wireless base station switching to the second wireless base station mode of operation, communicating from the wireless base station to the first CPE device a data bit pattern indicating that the first CPE device is to commence searching for downlink control information directed to the first CPE device in the downlink control channel when said first CPE device detects the data pattern in user data received from the wireless base station.

In some embodiments, the wireless communications method further includes the steps of: monitoring, by the wireless base station, while operating in the second wireless base station mode of operation to detect a second condition; and upon detecting the second condition exists: (i) communicating, by the wireless base station, to the first CPE device the data pattern indicating that the first CPE device is to commence searching for downlink control information directed to the first CPE device in the downlink control channel; and (ii) switching by the wireless base station from operating in the second wireless base station mode of operation to operating in the first wireless base station mode of operation, said switching from operating in a second wireless base station mode of operation to operating in the first wireless base station mode of operation including switching to using the downlink control channel for transmitting downlink control information to the first customer premises equipment device from the downlink control channel being used to transmit user data.

The present invention is also applicable to and includes apparatus and systems such as for example, apparatus and systems that implement one or more of the steps of the method embodiments. An exemplary communications system in accordance with the present invention includes a wireless base station including: memory; and a processor included in the wireless base station which controls the operation of the wireless base station to perform the following operations: (i) monitor a downlink channel utilization rate of data transmissions from the wireless base station to a first customer premises equipment (CPE) device on a downlink shared channel to detect a first condition; and (ii) upon detecting that the first condition exists, switching from operating in a first wireless base station mode of operation to operating in a second wireless base station mode of operation, said switching from operating in a first wireless base station mode of operation to operating in a second wireless base station mode of operation including switching from using a downlink control channel for transmitting downlink control information to the first customer premises equipment device to using the downlink control channel for transmitting user data.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 illustrates the combination of FIGS. 2A, 2B, 2C, 2D, 2E and 2F.

FIG. 2B illustrates the steps of the second part of an exemplary method in accordance with one embodiment of the present invention.

FIG. 2E illustrates the steps of the fifth part of an exemplary method in accordance with one embodiment of the present invention.

FIG. 2F illustrates the steps of the sixth part of an exemplary method in accordance with one embodiment of the present invention.

FIG. 12 illustrates an exemplary table including an exemplary set of customer premises equipment device records maintained at a wireless base station.

FIG. 13 illustrates another exemplary table of an exemplary set of customer premises equipment device records maintained at a wireless base station.

DETAILED DESCRIPTION

Figure 1:
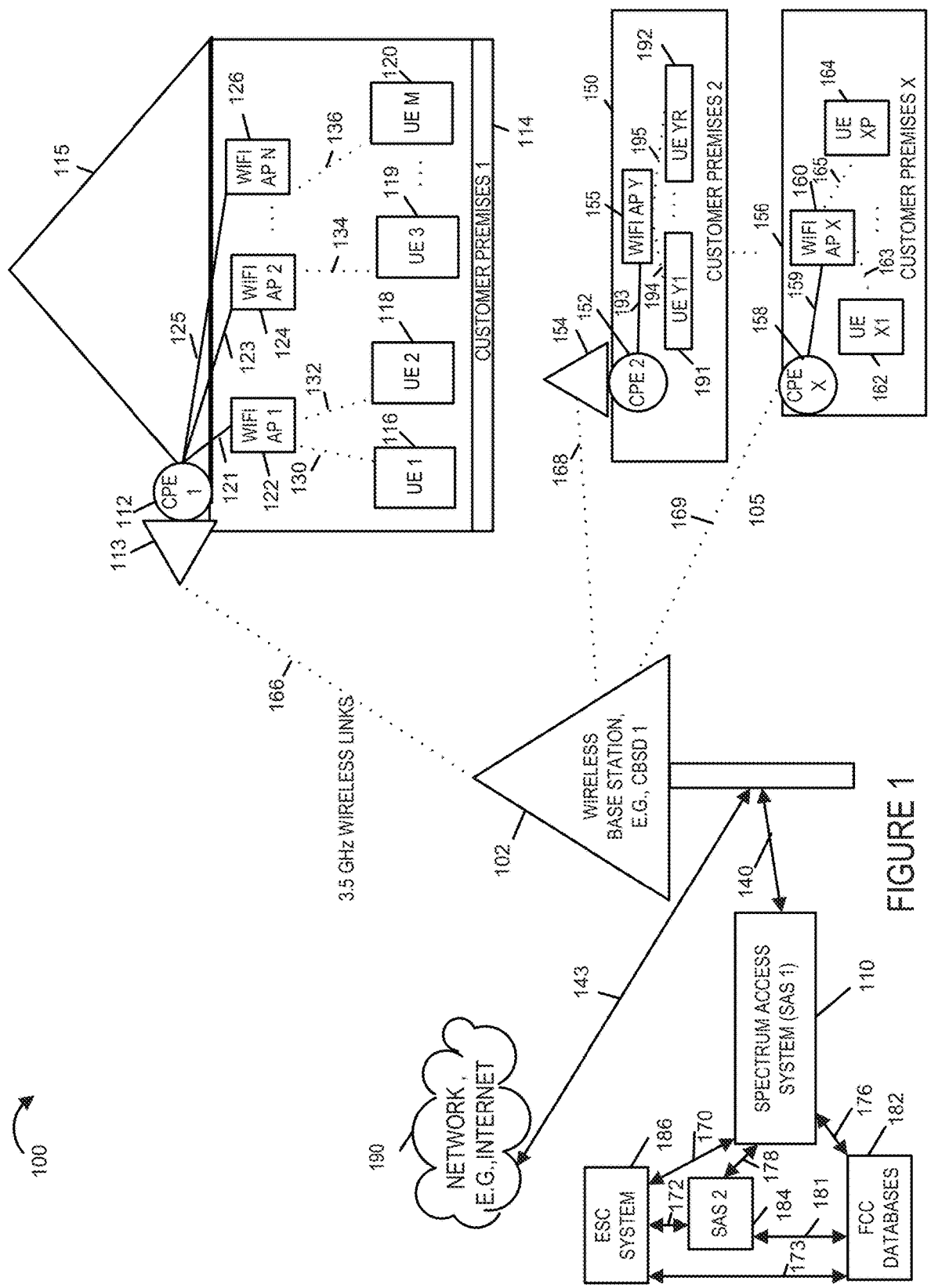
FIG. 1 illustrates an exemplary wireless communications system shown as a Citizens Broadband Radio Service network system 100 that provides wireless communications services in accordance with one embodiment of the present invention.

The current invention is applicable to wireless networks, e.g., Citizens Broadband. Radio Service (CBRS) networks, that provide wireless communications services, e.g., broadband services to user equipment devices at customer premises. The present invention is particularly useful in fixed wireless access networks in which the network environment is a relatively controlled environment since the customer premises equipment devices are fixed at certain locations, i.e., at customer premises, in the network. The present invention provides new and/or improved methods and apparatus for managing the use of channels and/or bandwidth to provide downlink control signals and data, e.g., user data, to customer premises equipment devices. The present invention further relates to methods and apparatus for managing by wireless base stations downlink control channels and downlink shared data channels to provide downlink control information and user data to customer premises equipment devices located at fixed positions on customers premises and providing backhaul services to one or more user devices located at the premises.

As previously discussed while in normal Long Term Evolution (LTE) wireless network operation and 5G wireless network operation, the wireless base station uses a Physical Downlink Control Channel (PDCCH) to communicate downlink control information to user equipment devices and a Physical Downlink Shared Channel (PDSCH) to communicate data, e.g., user data to user equipment devices. The Physical Downlink Control Channel (PDCCH) is used as a pointer to show the location of the Physical Downlink Shared Channel resources for the user equipment device in a resource grid (e.g., a time and frequency resource map). The Physical Downlink Shared Channel carries the actual user data for the user equipment devices being serviced by the wireless base station. As the user terminals are typically mobile terminals they are not at fixed positions. Under mobility scenarios and for scenarios with user equipment providing services to a single user, this method is useful because a user equipment device is not active all the time, the type of traffic consumed changes frequently, the location of the user equipment device changes frequently which changes the radio frequency channel dynamics.

However, for fixed wireless access systems, where a customer premises equipment device is almost always active, there is typically a fixed amount of downlink traffic, e.g., user data, going to the customer premises equipment device for a very high percentage of time. The CPE devices are not mobile and typically provide services for a plurality of devices at the customer premises location. As a result, the PDCCH channel bandwidth is not being efficiently utilized and additional processing is being required at both the wireless base station to generate and send downlink control information and the CPE devices in connection with searching for, receiving and processing downlink control information to identify where in the PDSCH channel its user data is located.

In one exemplary method embodiment of the present invention, the method includes the steps of: monitoring, by a wireless base station, a downlink channel utilization rate of data transmissions from the wireless base station to a first customer premises equipment (CPE) device on a downlink shared channel to detect a first condition; and upon detecting, by the wireless base station, that the first condition exists, switching from operating in a first wireless base station mode of operation to operating in a second wireless base station mode of operation, said switching from operating in a first wireless base station mode of operation to operating in a second wireless base station mode of operation including switching from using a downlink control channel for transmitting downlink control information to the first customer premises equipment device to using the downlink control channel for transmitting user data. By utilizing the downlink control channel for transmitting user data, e.g., to the first CPE device the channel capacity and/or bandwidth and/or spectrum has been increased for downlink user data transmission. In most embodiments, the downlink control channel is a Physical Downlink Control Channel and the shared downlink channel is a Physical Shared Downlink Control Channel. These embodiments may be, and in some embodiments are, implemented using system 100 shown in FIG. 1 and described in detail below. Various additional embodiments of the present invention will be explained in further detail below.

Citizens Broadband Radio Service networks are networks that include user equipment devices, e.g., mobile or wireless devices such as for example cell phones, smart phones, laptops, tablets, smart TVs, Citizens Broadband Radio Service Devices (CBSDs) which serve as access points/base stations, and Spectrum Access Systems which provides spectrum assignments and manage frequency interference through power management of the CBSDs transmission power. The Citizens Broadband Radio Service network utilizes the 150 megahertz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

Various embodiments of the present invention describe methods, apparatus, systems and techniques for providing wireless services, e.g., broadband services, to one or more devices at a customer premises. In the present invention, Citizen Broadband Radio Service spectrum, 3.5 GHz frequency spectrum band, is used to serve users. The invention is useful to provide broadband services to geographically isolated or remote areas, e.g., rural areas, where wired or optical connections are expensive and not economical given the number of customers to be serviced. The invention is also useful in urban areas where wireless services may be preferred as a replacement for wired connections or in addition to wired connections. In the present invention, a CBRS Customer Premise Equipment device (CPE) is located at a customer's premises inside of a house, business or any place where there are CBRS network users. The CBRS CPE device is coupled or connected to at least one CBRS fixed wireless access (FWA) tower base station (e.g., CBSD) over wireless communications links. The CBRS CPE is typically located in a building such as a home and is coupled to one or more antennas or an antenna array through which the CBRS CPE device transmits to and receives from the antenna(s) of the CBRS FWA tower base station (CBSD) wireless signals over the wireless communications link. These wireless communications links being in the 3.5 GHz frequency spectrum band. The CBRS CPE device in some embodiments includes external antennas. In some embodiments, the CBRS CPE device includes one or more internal antennas. In some embodiments, the CBRS CPE device includes one or more internal antennas and one or more antenna ports to which one or more external antennas are connected. The CBRS CPE device is coupled through a wired connection, e.g., a cable to one or more Wireless Fidelity (Wi-Fi) Access Points. The CBRS CPE device also referred to herein as CPE device or CPE serves the subscribers or users located in its coverage area, e.g., in the house, building, or on the customer's premises. The one or more Wi-Fi access points provide Wi-Fi services to the one or more end point devices or user equipment devices located at the customer premises. The one or more Wi-Fi access points are connected over a cable or wired communications to the CBRS CPE device through which backhaul is provided. As described above, the CBRS CPE device is located at a fixed position and while it is stationary, it provides services through Wi-Fi connections to users which may be stationary or mobile.

The wireless base station in the exemplary embodiment is a CBRS FWA tower base station which is a CBSD device and as such its transmission power levels and spectrum bandwidth are allocated or assigned to it via a Spectrum Access System of the CBRS network. The CBRS network includes multiple CBSD devices though only a single wireless base station, CBSD, is shown in the exemplary system 100 illustrated in FIG. 1.

Each wireless base station, e.g., CBRS FWA tower base station/CBSD, is coupled to and registered with a CBRS network Spectrum Access System (SAS) of the CBRS network. The CBRS network Spectrum Access System manages the allocation of CBRS network spectrum and transmission power levels. The SAS is responsible for assigning/allocating spectrum to the CBRS FWA tower base stations.

The wireless base station manages the allocation of spectrum and/or bandwidth allocated to it by the SAS for communicating with the CPE devices it is supporting. For example, the wireless base station determines the amount of downlink control channel capacity or spectrum to be used for communicating with each CPE device it is servicing, e.g., number of physical resources blocks made available for communicating downlink control information to each CPE device it is servicing. The wireless base station also determines the amount of downlink shared channel capacity or spectrum to be used for communicating user data to each CPE device it is servicing, e.g., number of physical resources blocks made available for communicating user data to each CPE device it is servicing.

The CBRS CPE device antenna(s) are typically located at an elevated position such as for example on the top of a roof of a building or on a pole outside the building in which the CBRS CPE device is located. In some embodiments, the CBRS CPE device includes one or more internal antennas and/or one or more antenna ports for connecting the device via a wire to external antennas mounted outside of the building.

The transmission power levels allocated for the wireless base stations, e.g., CBRS FWA tower base stations/CBSDs, are high in comparison to the transmission power level of the CPE devices, e.g., CBRS CPE devices. For example, a CBRS FWA tower base station coverage area can include hundreds of customer premises while the CBRS CPE device has a much smaller coverage area. Each CBRS CPE located at a customer's premises provides services to subscriber's user equipment devices such as computers, laptops, tablets, smart devices (e.g., appliances, watches, smartTVs), streaming devices, WiFi devices via one or more Wi-Fi Access Points. The CPE device includes at least one wireless interface for communicating with wireless base station, e.g., CBRS FWA tower base station. The CPE device also includes one or more wired and/or optical interfaces so that it can be coupled to and communicate with WiFi access points or base stations and/or other devices with wired and/or optical interfaces such as internet telephony systems, cable network devices, internet media streaming devices, e.g., over wired or optical networks (e.g., local area networks or wide area networks) at the customer's premises. The CPE device provides bridging and/or protocol converter and/or router functionality as the CPE device converts wireless signals received in a first protocol format, e.g., 5G wireless signal, CBRS wireless signal or a cellular wireless signal, to a format that is understood by the Wi-Fi access points.

FIG. 1 illustrates an exemplary wireless communications system 100 illustrated as a CBRS network communications system, having an architecture implemented in accordance with an embodiment of the present invention and being coupled to a network 190 (e.g., the internet). The communications system 100 also referred to as the CBRS communications network system 100 includes at least one wireless base station 1 102 illustrated as a Citizens Broadband Radio Service Fixed Wireless Assess (FWA) tower base station (CBSD) (e.g., CBSD 1), a plurality of Spectrum Access System devices (SAS 1 110, SAS 2 184), a plurality of customer premises (customer premises 1 114, customer premises 2 150, . . . , customer premises X 156, X being an integer greater than 2), a plurality of CBRS Customer Premises Equipment devices (CBRS CPE device 1 112, CBRS CPE device 2 152, . . . , CBRS CPE device X 158, X being integer greater than 2), a plurality of Wi-Fi Access Points or base stations (Wi-Fi AP 1 122, Wi-Fi AP 2 124, . . . , Wi-Fi AP N 126, Wi-FI AP Y 155, WiFi AP X 160) an ESC system 186, a FCC Database System 182, and a plurality of communications links 121, 123, . . . , 125, 130, 132, 134, . . . , 136, 140, 143, 159, 165, 163, 166, 168, 169, 170, 172, 173, 176, 178, and 181. The CBRS system 100 is coupled to a network 190, e.g., the Internet, through which various services can be provided such as for example voice over internet call services, video on demand services, video conferencing services. In some embodiments, the network is a part of the CBRS network and the services are provided from CBRS network service providers. In the example system shown in FIG. 1 the wireless base station 102, e.g., CBRS FWA tower base station 1 or CBSD 1 is illustrated as being coupled or connected to the network 190 via communications link 143 which may be a wired, wireless or optical link. Though not shown the CBRS network typically includes other wireless base stations, e.g., CBRS tower base stations or CBSDs, which are also typically coupled or connected to the network 190 via communications links. In some embodiments, the wireless base stations, e.g., CBRS tower base stations or CBSDs, are coupled to a packet gateway system which is part of and located in the network 190.

CPE device 1 (CPE 1) 112, e.g., CBRS CPE device, includes an antenna system 113, e.g., one or more antenna or an antenna array mounted on a roof of a building 115, e.g., home or office building, located in customer premises 1 114 for communicating with the wireless base station 102, e.g., CBRS tower base station 1 102. The antenna being coupled to a portion of the CPE device 1 which is located inside the house 115 and which also includes separate interfaces for communicating with Wi-Fi Access Points located at the customer premises or within its coverage range. Wi-Fi Access Points 122, 124, and 126 are coupled to or connected to the CPE device 1 112 via wires or cables 121, 123, and 125 respectively in the exemplary embodiment.

CPE device 2 (CPE 2) 152, e.g., CBRS CPE device 2, is located at the customer premises 2 150 and includes an antenna system 154 located at an elevated position (e.g., mounted on a pole or roof of a building located at the customer premises 2 150) for communicating with the wireless base stations e.g., wireless base station 102, e.g., CBRS tower base station 1 102. The elevation of the antenna system allows for less obstruction of wireless signals do to other structures and hence provides for a larger geographical area within which it can exchange wireless signals with wireless base stations, e.g., CBRS tower base stations. CPE 2 152 also includes a separate interface for communicating with a Wi-Fi Access Point located at the customer premises or within its coverage range. Wi-Fi Access Point Y 155 is coupled to or connected to the CPE device 2 152 via a wire or cable 193 in the exemplary embodiment. While only a single Wi-Fi AP Y 155 is shown as receiving services from the CPE device 2 152 at customer premises 2 150, in various embodiments more than one Wi-Fi Access Point may be implemented and coupled and/or connected to CPE device 2 152 and receive services via the CPE device 2 152.

CPE device X (CBRS CPE X) 158 is located at the customer premises X 156 and includes an internal antenna and/or antenna array within the device for communicating with wireless base stations, e.g., CBRS tower base station 1 102 also referred to as CBSD 1.

Customer premises 1 114 includes Wi-Fi Access Point 1 (Wi-Fi AP 1) 122, Wi-Fi AP 2 124, . . . , Wi-Fi AP N (N being an integer greater than 2) which provide Wi-Fi services to the user equipment devices at the customer premises 1 114 which include UE 1 116, UE 2 118, UE 3 119, . . . , UE M 120, where M is an integer greater than 3.

Customer premises 2 150 similarly includes one or more Wi-Fi access points and UE devices though only a single Wi-Fi Access Point Y 155 and user equipment devices UE Y1 191, . . . , UE YR 192 are shown for the sake of simplicity. UE Y1 191, . . . , UE YR 192 being coupled to the Wi-Fi Access Point Y 155 via wireless communications links 194, . . . , 195.

Customer premises X 156 includes CPE device X 158, Wi-Fi Access Point X 160 and endpoint or user equipment devices UE X1 162, . . . , UE XP 164, where P is an integer greater than 1. The user equipment devices UE X1 162, . . . , UE XP 164 being coupled or connected to the Wi-Fi AP X 160 via Wi-Fi communications links 163 and 165. The Wi-Fi AP X 160 being coupled or connected to the CPE X via a communications link 159 such as for example a wire or cable connection.

In the exemplary embodiment, the user equipment devices UE 1 116, UE 2 118, UE 3 119, . . . , UE M 120, UE Y1 191, . . . , UE YR 192, and UE X1 162, . . . , UE XP 164 are enabled to wirelessly communicate using a wireless protocol which in this example is a Wi-Fi protocol which is different than the wireless protocol used to communicate between the CPE devices and the wireless base stations which use a 5G protocol such as the CBRS wireless protocol.

In some embodiments, the Wi-Fi Access Points are Wi-Fi routers and the UE devices at the customer premises may be, and in some embodiments are, coupled or connected to the Wi-Fi Access Points or routers via cables or wires.

The SAS 1 110 is coupled to SAS 2 184 via communications link 178. SAS 1 110 is coupled to FCC Databases 182 via communications link 176. SAS 2 184 is coupled to FCC Databases 182 via communications link 181. ESC system 186 is coupled to SAS 1 110 and SAS 2 184 via communications links 170 and 172 respectively. The ESC System 186 is coupled to the FCC Databases 182 via communications link 173. The ESC system 186 is used to detect and/or sense Navy radar operations in CBRS operation within 3550-3650 MHz near the coasts and provide notifications over the communications links to SAS 1 110 and SAS 2 184. SAS 1 110 manages the CBRS tower base station 1 102 spectrum allocation and transmission power to limit interference in the CBRS network. SAS 2 184 manages CBSDs including other CBRS tower base stations in the CBRS network which are not shown in FIG. 1. SAS 1 110 and SAS 2 184 communicate and share information regarding the CBRS network coverage of the CBSDs including CBRS tower base stations each respectively manage and coordinate management of the allocation of spectrum and power transmission levels of CBSDs including CBRS tower base stations throughout the CBRS network. While only two SAS devices are shown in FIG. 1, it should be understood that additional SAS devices are typically used in the CBRS network. In some embodiments, one or more of the CBRS tower base stations of the CBRS network are also coupled or connected to each other either through wired and/or wireless communications links so that they can communicate and exchange information.

In the exemplary embodiment, the communications links 166, 168, and 169 are wireless communications links in the 3.5 GHz frequency spectrum band. The communications link 166 couples or connects the wireless base station 102, e.g., CBRS tower 1 base station 102, to CPE device 1 112. The communications link 168 is also a wireless communications link in the 3.5 GHz frequency spectrum band that couples or connects wireless base station 102 to CPE device 2 152. The communications link 169 is a wireless communications link in the 3.5 GHz frequency spectrum band that couples or connects wireless base station 102 to CPE device X 158. The CPE devices are fixed or non-mobile devices located at customer premises. The wireless base station 102 only provides wireless services to users via fixed non-mobile CPE devices.

Communications links 140, 143, 170, 172, 173, 176, 178, 181 are typically wired communications links or fiber optical cables. Communications links 140 couples or connect SAS 1 110 to wireless base station, e.g., CBSD 1 102.

The communications links 130, 132, 134, . . . , 136 are Wi-Fi wireless communications links which couple or connect user equipment device 1 (UE 1) 116, user equipment device 2 (UE 2) 118, user equipment device 3 (UE 3) 119, . . . , user equipment device M 120 to Wi-Fi Access Points as shown in FIG. 1.

The communications links 194 and 195 are Wi-Fi wireless communications links which couple or connect user equipment device UE Y1 191 and user equipment device UE YR 192 to Wi-Fi Access Point Y 155 as shown in FIG. 1.

The communications links 163 and 165 are Wi-Fi wireless communications links which couple or connect user equipment device UE X1 162 and user equipment device UE XP 164 to Wi-Fi Access Point X 160 as shown in FIG. 1.

In the exemplary system 100, one or more of the customer premises do not have wired or optical communications links that provide broadband services to the user devices located at the customer premises instead broadband services are provided by the wireless network, e.g., CBRS network by the wireless communications links coupling the wireless base station 102, e.g., CBRS tower base station 1 102, to the user devices located at the customer premises via the indirect wireless connections via the CPE device and Wi-Fi Access Points located at the customer premises. Exemplary customer premises include campuses (e.g., college campuses), buildings such as for example homes, hospitals, libraries, office buildings, warehouses, parks, etc. and as such have varying diverse demands for the number of user equipment devices and loading that the wireless base station needs to support. In some embodiments, the wireless base station is located in a rural area where cable links are not economical and the wireless base station provides the broadband services to the users located at the customer premises within its cell coverage via the CPE devices. The CPE devices communicate with the wireless base stations through interfaces that operate as CBRS user equipment devices and not as CBSD base stations.

In some embodiments, the CPE devices located at the customer premises include Wi-Fi routers or router circuitry and directly communicate with the Wi-Fi devices within their coverage area without requiring separate Wi-Fi Access Points.

It is to be understood that the communication links shown in system 100 are only exemplary and other network configurations and communications links may be employed that couple together the devices, base stations, access points, nodes, entities, and databases of the system 100. Elements or steps with the same reference numbers used in different figures are the same or similar and those elements or steps will not be described in detail again.

While for the sake of simplicity in explaining the invention system 100 only illustrates a single wireless base station shown as CBRS tower base station device (CBSD), two SAS devices and a few customer premises with a single CPE device located therein servicing a few UE devices through one or more Wi-Fi Access Points, it will be appreciated that system 100 typically includes a large plurality of wireless base stations, e.g., CBRS tower base stations or CBSDs, with a large number, e.g., hundreds, of customer premises within each of the wireless base station's, e.g., CBRS tower base station's, coverage range including a CPE device which is supporting a plurality of Wi-Fi Access Points and a plurality of UE devices at the customer premises with the wireless base stations being managed by a plurality of SAS devices which are in communication with one another.

Figure 3:
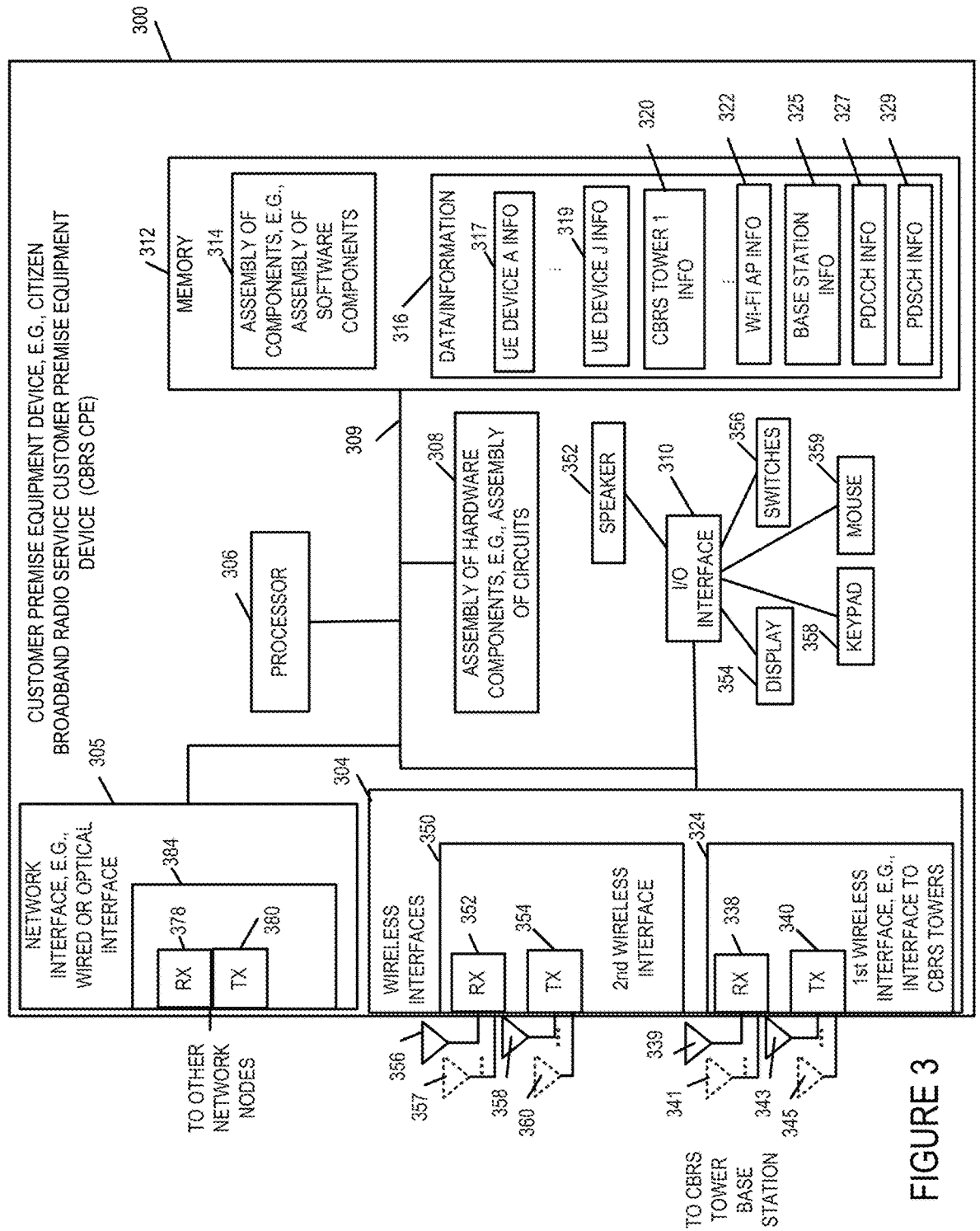
FIG. 3 illustrates details of an exemplary Customer Premises Equipment device, e.g., a Citizens Broadband Radio Service Customer Premise Equipment (CBRS CPE) device, in accordance with one embodiment of the present invention.

FIG. 3 is a drawing of an exemplary CPE device 300, e.g., a Citizens Broadband Radio Service Customer Premise Equipment device 300, in accordance with an exemplary embodiment. Exemplary CPE device 300 includes wireless interfaces 304, a network interface 305, e.g., a wired or optical interface, a processor 306, e.g., a CPU, an assembly of hardware components 308, e.g., an assembly of circuits, and I/O interface 310 and memory 312 coupled together via a bus 309 over which the various elements may interchange data and information. CPE device 300 further includes a speaker 352, a display 354, switches 356, keypad 358 and mouse 359 coupled to I/O interface 310, via which the various I/O devices (352, 354, 356, 358, 359) may communicate with other elements (304, 305, 306, 308, 312) of the CPE device 300. Network interface 305 includes a receiver 378 and a transmitter 380. In some embodiments, receiver 378 and transmitter 380 are part of a transceiver 384. Wireless interfaces 304 include a plurality of wireless interfaces including first wireless interface 324 and a second wireless interface 350. The first wireless interface 324 is used to communicate with the wireless base station, e.g., CBRS tower base station. The second wireless interface is optional and can be used to communicate with a different wireless base station than the first wireless interface for example to obtain additional backhaul capability. The first wireless interface 324 includes wireless receiver 338 and a wireless transmitter 340. In some embodiments, receiver 338 and transmitter 340 are part of a transceiver. In various embodiments, the first wireless interface 324 includes a plurality of wireless receivers and a plurality of wireless transmitters. Wireless receiver 338 is coupled to a plurality of receive antennas (receive antenna 1 339, . . . , receive antenna M 341), via which CPE device 300 can receive wireless signals from other wireless communications devices including a second wireless communications device, e.g., a wireless base station, e.g., CBRS tower base station or CBSD. Wireless transmitter 340 is coupled to a plurality of wireless transmit antennas (transmit antenna 1 343, . . . , transmit antenna N 345) via which the CPE device 300 can transmit signals to other wireless communications devices including a second wireless communications device, e.g., wireless base station such as a CBRS tower base station. The antennas 339, . . . , 341 and 343, . . . , 345 are typically mounted on the roof of the building in which the CPE device is located or on a poll at an elevated height with the other elements of the CPE device being connected to the antennas via a wired or fiber optic connection. In some embodiments the various antennas form an antenna array with the antennas pointing in different directions. In some embodiments, one or more of the antennas are included inside the housing of the CPE device and the CPE device includes one or more connections to which exterior antennas may be connected.

The second optional wireless interface 350 includes wireless receiver 352 and a wireless transmitter 354. In some embodiments, receiver 352 and transmitter 354 are part of a transceiver. In various embodiments, the second wireless interface 350 includes a plurality of wireless receivers and a plurality of wireless transmitters. Wireless receiver 352 is coupled to one or more receive antennas (receive antenna 1 356, . . . , receive antenna M 357), via which CPE device 300 can receive wireless signals from other wireless communications devices including a second wireless communications device, e.g., a second wireless base station using the same or a different wireless protocol than the first wireless interface. Wireless transmitter 354 is coupled to one or more wireless transmit antennas (transmit antenna 1 358, . . . , transmit antenna N 360) via which the CPE device 300 can transmit signals to other wireless communications devices including a second wireless communications device. In some embodiments, the second wireless interfaces 350 are Wi-Fi interfaces so that the CPE device can communication over Wi-Fi wireless links to user equipment devices. In some such embodiments, the CPE device includes one or more hardware and/or software components that provide wireless routing services for the Wi-Fi interfaces and the CPE device also acts as a Wi-Fi router.

The CPE device network interface 305 may be coupled to Wi-Fi Access Points, LAN networks, WANs, routers, e.g., WiFi routers or Access Points, so that various devices in the home without wireless interfaces can also be serviced via wired or optical links by the CPE device 300.

Memory 312 includes an assembly of components 314, e.g., an assembly of software components, and data/information 316. Data/information 316 includes UE device information corresponding to a plurality of user equipment devices (UE device A information 317, . . . , UE device J information 319 where A to M are the UE devices being serviced by the CPE device) and wireless device base station information (e.g., CBRS tower base station 1 information 320) and Wi-Fi Access Point Information 322 which includes information about the Wi-Fi Access Points connected to the CPE device, base station information 325 including information communicated to the CPE device from the wireless base station such as for example, information to locate downlink control information communicated to the CPE device in Physical Downlink Control Channel, mode of operation of the wireless base station, information to locate data, e.g., user data, communicated to the CPE device in the Physical Downlink Shared Channel, amount of time which the CPE device is not to search for downlink control information in the Physical Downlink Control Channel, amount of time the wireless base station will not transmit downlink control information to the CPE device in the Physical Downlink Control Channel, a data pattern, e.g., a data bit pattern, indicating that the CPE device is to switch from operating in a second CPE mode of operation to operating in a first mode of operation and commence searching for downlink control information in the Physical Downlink Control Channel, information indicating that data, e.g., user data, will be sent to the CPE device in the Physical Downlink Control Channel instead of downlink control information. Data/information 316 also includes Physical Downlink Control Channel information 327 which includes downlink control information communicated to the CPE device from wireless base station including location information (e.g., time and frequency information) that identifies or maps where in the Physical Downlink Shared Channel data, e.g., user data, communicated to the CPE device can be located. In some embodiments the information 327 is included with the base station information 325. Data/information 316 also includes Physical Downlink Shared Channel information 329 which includes in some embodiments data, e.g., user data, communicated to the CPE device using the Physical Downlink Shared Channel. In some embodiments, the Physical Downlink Shared Channel information 329 includes the location information (e.g., time and frequency information) that identifies or maps where in the Physical Downlink Shared Channel data, e.g., user data, communicated to the CPE device can be located. In some embodiments, one or more of the CPE devices shown and/or discussed in connection with the Figures and methods discussed herein including one or more of CPE device 1 112, CPE device 2 152, . . . , CPE device X 158 are implemented in accordance with CPE device 300.

Figure 4:
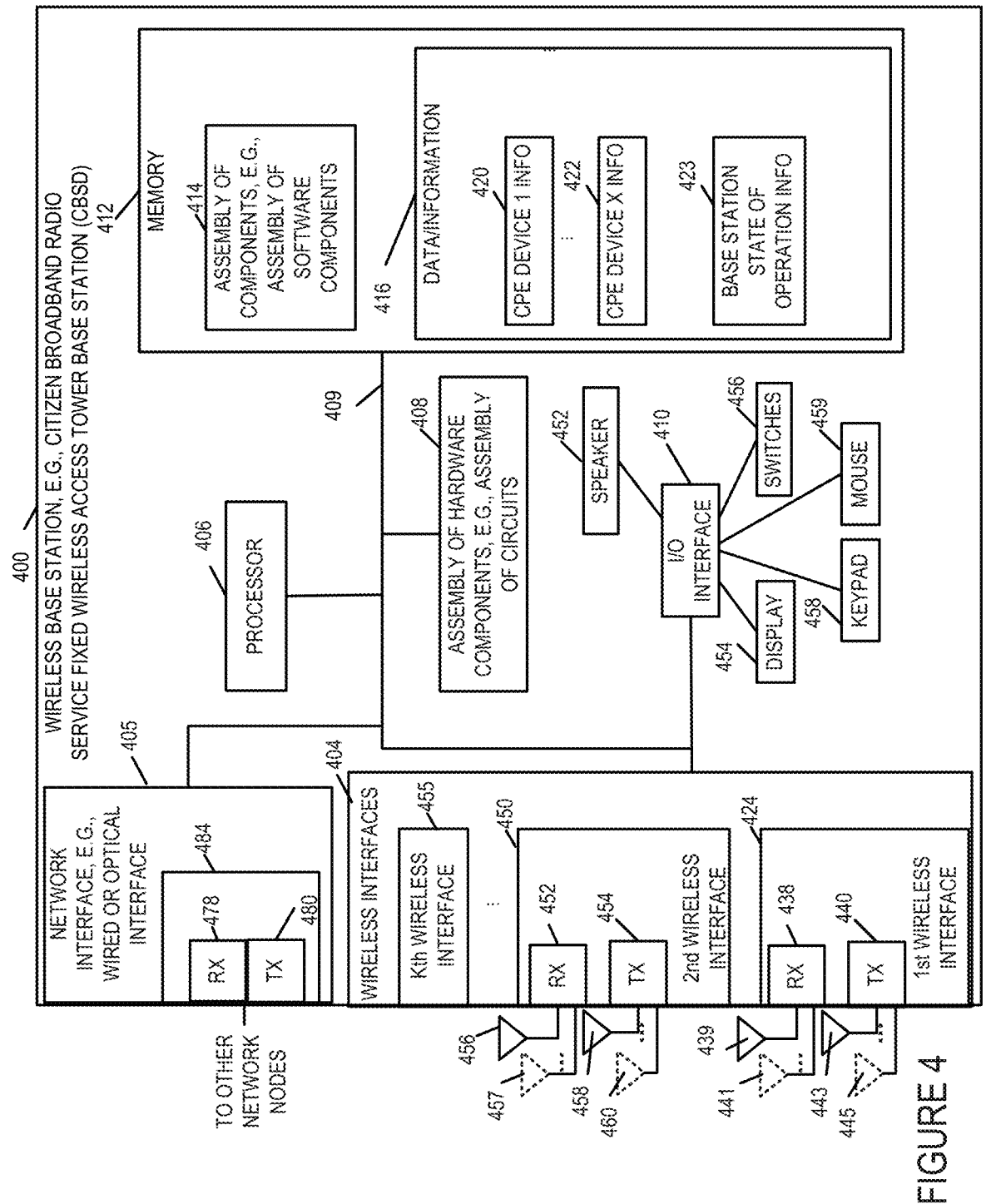
FIG. 4 illustrates details of an exemplary wireless base station, e.g., a Citizens Broadband Radio Service tower base station also referred to as Citizens Broadband Radio Service Device, in accordance with one embodiment of the present invention.

FIG. 4 is a drawing of an exemplary wireless base station 400, e.g., a Citizens Broadband Radio Service Fixed Wireless Access Tower Base Station (CBSD) 400, in accordance with an exemplary embodiment. Exemplary wireless base station 400, e.g., CBRS tower base station 400, includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. The wireless interfaces are used to communicate with the CPE devices. The first wireless interface 424 is used for example to communicate with a CPE device, e.g., CPE 1 112. The second wireless interface can be used to communicate with a second CPE device, e.g., CPE 2 152. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a CPE device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., CPE device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., a CPE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled to a SAS system, other networks, e.g., internet, or other wireless base stations.

Memory 412 includes an assembly of components 414, e.g., an assembly of software components, and data/information 416. Data/information 416 includes CPE device information (CPE device 1 information 420, . . . , CPE device X information 422), and. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example hundreds of CPE devices. The CPE device information 420, . . . , 422 includes CPE profile record, information on whether the CPE device supports a second CPE mode of operation in which it does not search for downlink control information, mode of operation the CPE device is in one that requires downlink control information be sent to the CPE device via the PDCCH channel or one that does not require downlink control information to be sent to the CPE device via the PDCCH channel, downlink control information for the CPE device, data pattern to send to the CPE device to indicate to the CPE device to switch from the second CPE device mode of operation to first CPE device mode of operation and commence searching for downlink control information in the PDCCH channel, information identifying the location that data will be sent to the CPE device in the Physical Downlink Shared Channel, an amount of time specified for the CPE device to operate in the second CPE device mode of operation, downlink channel utilization rate for the CPE device and amount of time the CPE device downlink channel utilization has exceed a first threshold value. The base station state of operation information 423 includes mode of operation the wireless base station is currently operating in with respect to each CPE device (e.g., first wireless base station mode of operation (using PDCCH to communicate downlink control information to CPE device) or second wireless base station mode of operation in which PDCCH is used to communicate data, e.g., user data instead of downlink control information), tracking information including the amount of time the wireless base station has been operating in the second wireless base station mode of operation with respect to individual CPE devices being serviced, and the data pattern to send to a CPE device to indicate that the CPE device should commence searching for downlink control information in the PDCCH and/or switch from operating in a second CPE device mode of operation to a first CPE device mode of operation.

In some embodiments, one or more of the wireless base stations discussed and/or shown in the Figures and/or in connection with the methods discussed herein including wireless base station 102 are implemented in accordance with the wireless base station 400.

Figure 5:
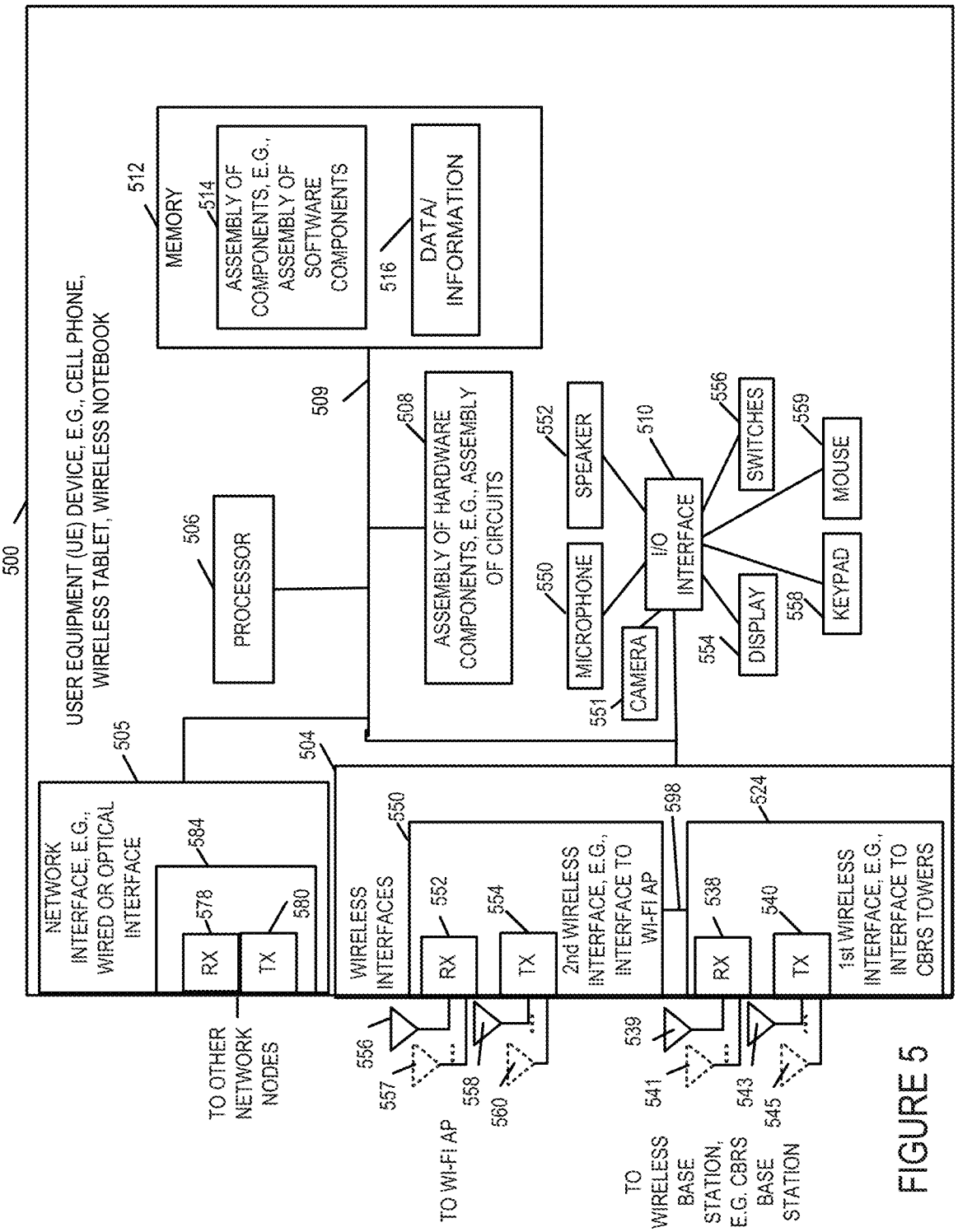
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a computer, a mobile device such as a cell phone, a smart phone, wireless tablet or wireless notebook, a smartTV, internet cable box, internet enabled device, WiFi device. UE device 500 includes WiFi device capabilities. UE device 500 in addition to having Wi-Fi device capabilities is also optionally enabled to communicate using at least one other wireless protocol, e.g., 5G wireless protocol, CBRS wireless protocol or cellular wireless protocol. The UE device 500 in some embodiments operates as both a cellular or 5G device which also has Wi-Fi capabilities. For example the first path or wireless protocol connection being a Wi-Fi protocol connection or channel and a second path or wireless protocol connection being via a 5G wireless protocol connection or channel or a cellular protocol connection or channel. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584.

Wireless interfaces 504 include a plurality of wireless interfaces including a first wireless interface 524 and a second wireless interface 550. The first wireless interface 524 is optionally and is used to communicate with a wireless base station, e.g., a 5G or cellular base station. The second wireless interface is used to communicate with a Wi-Fi Access Point. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., a 5G or LTE wireless base station which are not shown in FIG. 1. Wireless transmitter 540 is coupled to a plurality of wireless transmit antennas (transmit antenna 1 543, transmit antenna N 545) via which the user equipment device 500 can transmit signals to other wireless communications devices including a second wireless communications device, e.g., wireless base station such as a 5G or LTE base station. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, ..., receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, ..., transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a Wi-Fi wireless interface. The first wireless interface is connected or coupled to the second wireless interface via wire 598 so that the two interfaces can exchange information.

Memory 512 includes an assembly of components 514, e.g., an assembly of software components, and data/information 516.

In some embodiments, one or more of the user equipment devices shown in the figures or discussed herein for example in connection with the methods described including for example UE devices UE 1 116, UE 2 118, UE 3 119, ..., UE M 120, UE X1 162, ..., UE XP 164, UE Y1 191, ..., UE YR 192 are implemented in accordance with exemplary user equipment device 500. While the UE device 500 has been illustrated as a dual mode device that has two wireless interfaces 550 and 524, the UE device 500 may, and in most embodiments, is not a dual mode device but instead is a single mode operation device with the single wireless interface 2 550 which is a Wi-Fi interface which is enabled to communicate with a Wi-Fi Access Point or router. In many embodiments, UE devices UE 1 116, UE 2 118, UE 3 119, ..., UE M 120, UE X1 162, ..., UE XP 164, UE Y1 191, ..., UE YR 192 include a single wireless interface, wireless interface 550 through which they communicate with a Wi-Fi access point or router located at the customer premises at which the UE device is located as shown in FIG. 1.

Figure 6:
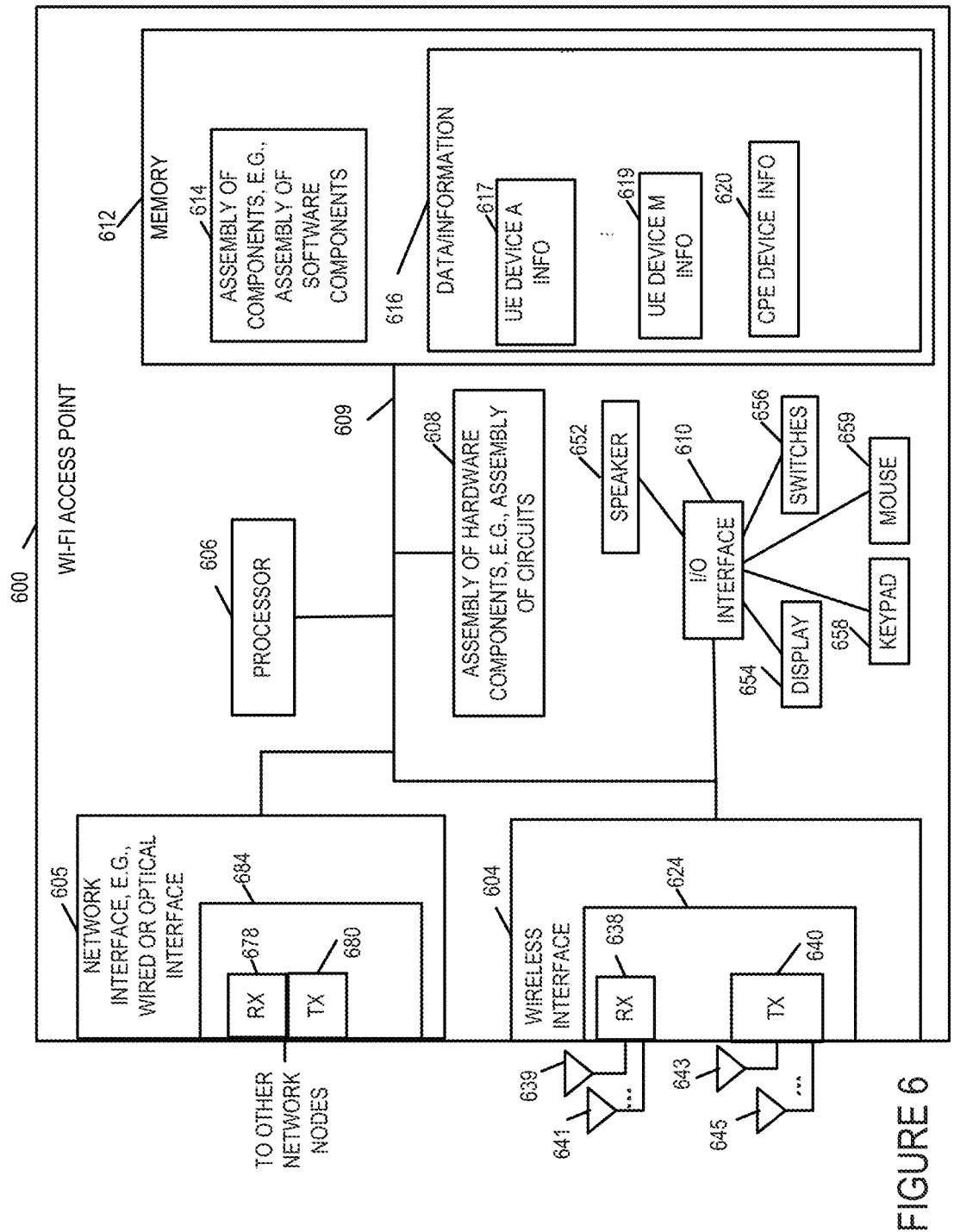
FIG. 6 illustrates details of an exemplary Wi-Fi Access Point in accordance with one embodiment of the present invention.

FIG. 6 is a drawing of an exemplary Wi-Fi Access Point 600 in accordance with an exemplary embodiment. Exemplary Wi-Fi Access Point 600 includes a wireless interface 604, e.g., a Wi-Fi interface for transmitting, receiving and processing Wi-Fi messages/packets, a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. Wi-Fi Access Point 600 further includes a speaker 652, a display 654, switches 656, keypad 658 and mouse 659 coupled to I/O interface 610, via which the various I/O devices (652, 654, 656, 658, 659) may communicate with other elements (604, 605, 606, 608, 612) of the Wi-Fi Access Point 600. Network interface 605 includes a receiver 678 and a transmitter 680. The network interface 605 is typically connected or coupled to a wired or optical communications link or network which in turn is coupled or connected to a CPE device. In some embodiments, receiver 678 and transmitter 680 are part of a transceiver 684. Wireless interface 604 includes a wireless receiver 638 and a wireless transmitter 640. In some embodiments, receiver 638 and transmitter 640 are part of a transceiver 624. In various embodiments, wireless interface 604 includes a plurality of wireless receivers and a plurality of wireless transmitters. Wireless receiver 638 is coupled to a plurality of receive antennas (receive antenna 1 639, ..., receive antenna M 641), via which Wi-Fi Access Point 600 can receive wireless signals from other wireless communications devices including a second wireless communications device, e.g., a UE device. Wireless transmitter 640 is coupled to a plurality of wireless transmit antennas (transmit antenna 1 643, ..., transmit antenna N 645) via which the Wi-Fi Access Point 600 can transmit signals to other wireless communications devices e.g., a UE device.

Memory 612 includes an assembly of components 614, e.g., an assembly of software components, and data/information 616. Data/information 616 includes UE device information corresponding to a plurality of user equipment devices (UE device A information 617, ..., UE device M information 619 where A to M are the UE devices being serviced by the Wi-Fi Access Point) and CPE device information (e.g., CPE device 1 information, CPE device 1 being the CPE device to which the Wi-Fi AP is connected) 620. The Wi-Fi Access Point includes in some embodiments multiple wireless interfaces or a wireless interface with multiple receivers and transmitters so that it can provides wireless services to a plurality of user equipment devices. In some embodiments, one or more of Wi-Fi Access Points discussed and/or shown in the Figures and/or in connection with the methods discussed herein including Wi-Fi Access Points 122, 124, ..., 126, 155, and 160 are implemented in accordance with the Wi-Fi Access Point 600.

Figure 7:
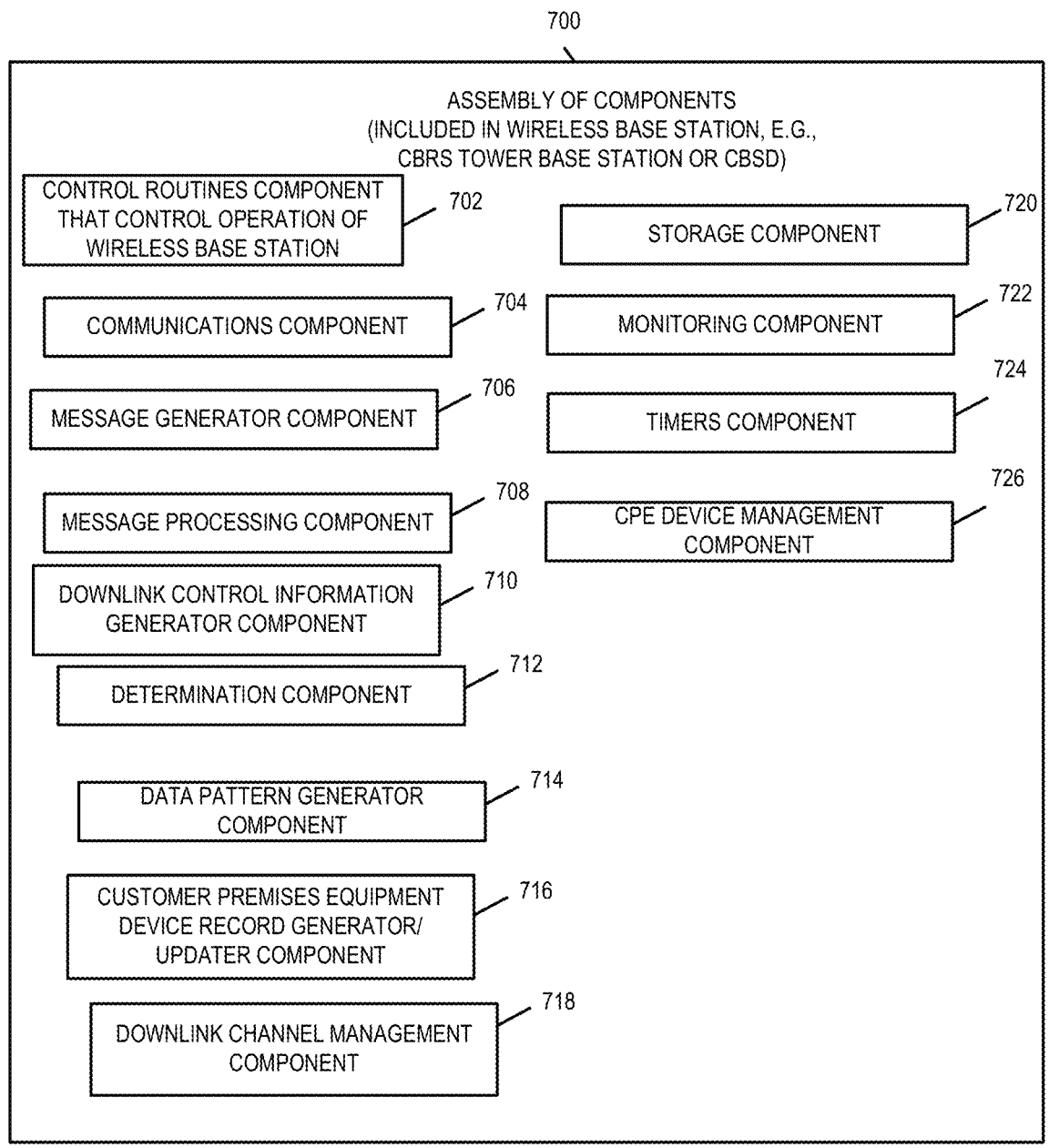
FIG. 7 illustrates an exemplary assembly of components for a wireless base station, e.g., CBRS tower base station or CBSD, in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a downlink control information generator component 710, a determination component 712, The data pattern generator component 714, a customer premises equipment device record generator/updater component 716, a downlink channel management component 718, a storage component 720, a monitoring component 722, a timers component 724, and a CPE device management component 726.

The control routines component 702 is configured to control operation of the wireless base station. The communications component 704 is configured to handle communications, e.g., transmission and reception of messages, and protocol signaling for the wireless base station. The message generator component 706 is configured to generate messages and/or signals for transmission to other devices. The message processing component 708 is configured to process received messages and/or signals and is sometimes a subcomponent of communications component 704.

The downlink control information generator component 710 generates downlink control information for a CPE device to be communicated to a CPE device via a downlink control channel such as for example a Physical Downlink Control Channel.

The determination component 712 makes various determinations for the wireless base station including for example, determining the current mode of operation of the wireless base station, determining whether a first condition or second condition exists, determining whether a CPE device downlink channel utilization rate exceeds a threshold value for a continuous period of time, determining a CPE device downlink channel utilization rate, determining PDCCH downlink control information for a CPE device, determining the current mode of operation of a CPE device, determining the amount of time to request and/or instruct a CPE device to operate in a second CPE device mode of operation (i.e., a no PDCCH mode of operation), determining whether the wireless base station is to switch from a first wireless base station mode of operation (a PDCCH mode of operation) to a second wireless base station mode of operation (a no PDCCH mode of operation) with respect to one or more CPE devices, determine whether to send data, e.g., user data, to a CPE device via the PDCCH channel instead of PDCCH downlink control information.

Figure 14:
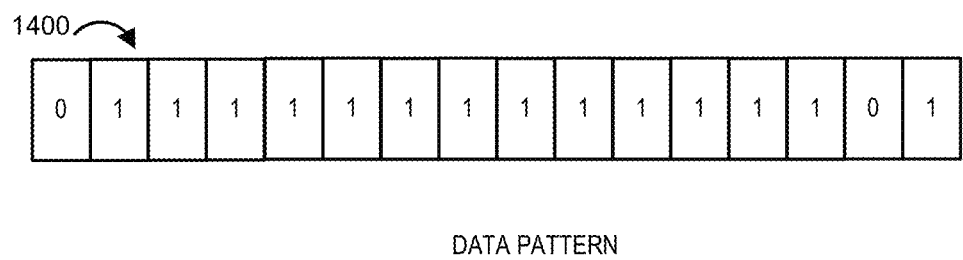
FIG. 14 illustrates an exemplary data pattern in accordance with an embodiment of the present invention.

The data pattern generator component 714 is configured to generate a data pattern such as for example the data pattern shown diagram 1400 of FIG. 14 to be used to indicate to a CPE device that the CPE device is to switch from a second CPE device mode of operation (i.e., a no-PDCCH mode of operation) to a first CPE device mode of operation (i.e., a PDCCH mode of operation).

The customer premises equipment device record generator/updater component 716 generates and/or updates customer premises equipment device records such as for example the customer premises equipment device records shown in tables 1200 of FIG. 12 and 1200' of FIG. 13.

The downlink channel management component 718 manages the PDCCH and PDSCH channels including there spectrum and/or bandwidth allocation to CPE devices and/or how and what information and/or data, e.g., user data, is communicated over the downlink channels to the downlink receiving devices, e.g., CPE devices.

The storage component 720 controls the storage and retrieval of information and data in the memory of the wireless base station.

The monitoring component 722 monitors wireless base station activities, customer premises equipment device activities, downlink channel utilization rates for CPE devices, whether on or more conditions exist, whether the downlink channel utilization rate for a CPE device exceeds a first threshold value, the amount of time until the wireless base station switches for a second wireless base station mode of operation (i.e., a no PDCCH mode of operation) to a first wireless base station mode of operation (i.e., a PDCCH mode of operation) with respect to a CPE device.

The timers component 724 is a component that implements one or more timers, e.g., a timer to track the amount of time that at a CPE device downlink channel utilization rate exceeds a first threshold value, a count down timer that tracks the amount of time until a CPE device is to switch from one mode of operation to another mode of operation, etc.

The CPE device management component 726 manages CPE devices connected to the wireless base station including tracking downlink channel utilization rates, CPE device capabilities (e.g., does the CPE device support a no PDCCH mode of operation), current mode of operation of the CPE device, instructions and/or request signals and/or messages communicated to CPE device, downlink control information communicated to CPE device, determination of whether one or more conditions are met with respect to a CPE device, and whether a CPE device should be instructed to switch its mode of operation.

Figure 8:
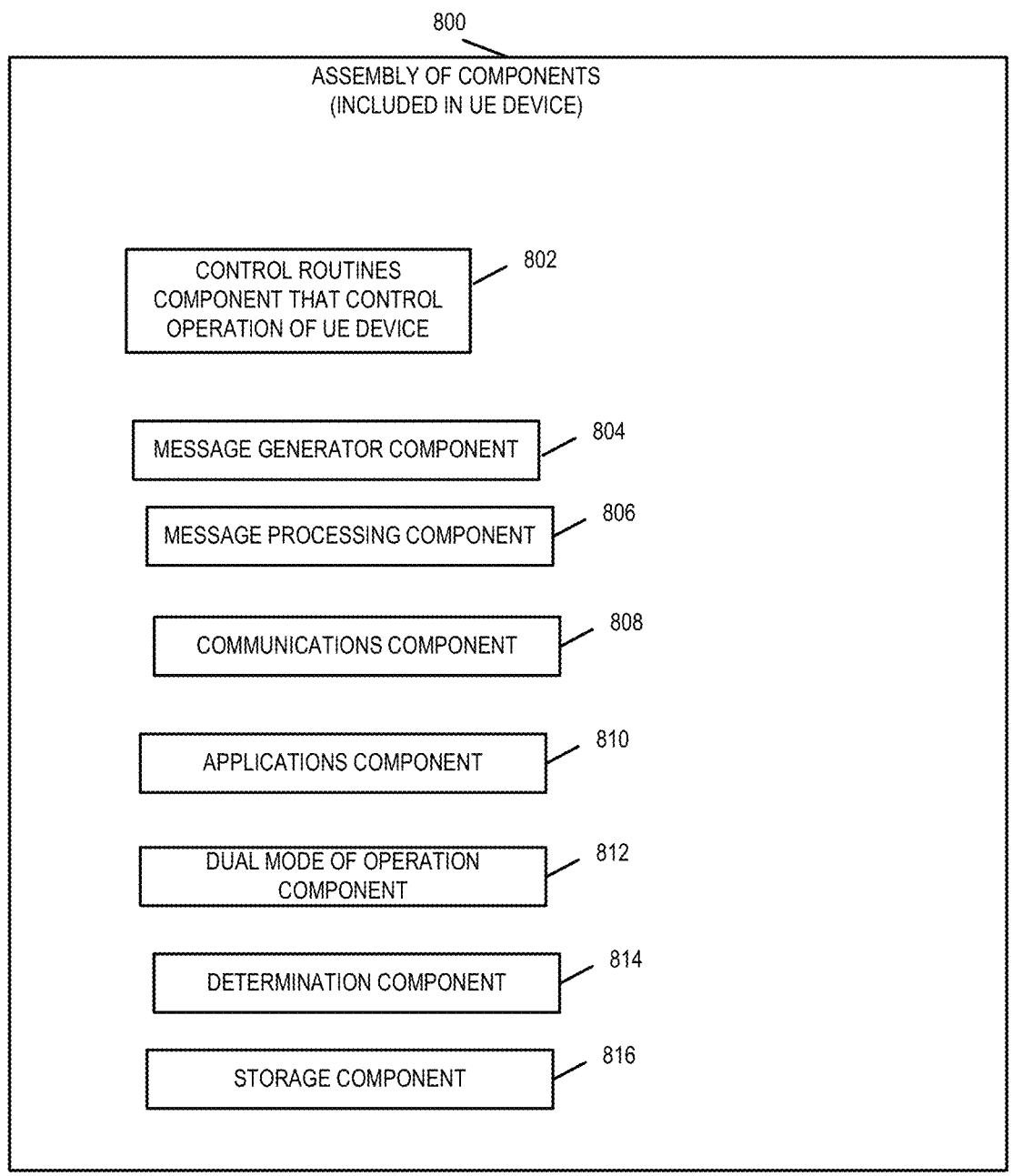
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a message processing component 806, a communications component 808, an applications component 810, an optional dual mode of operation component 812, a determination component 814, and a storage component 816.

The control routines component 802 is configured to control operation of the UE. The message generator component 804 is configured to generate messages for transmission to various devices including for example a Wi-Fi Access Point when the UE device is a Wi-Fi device and wireless base station (e.g., CBSD) when the device is a CBRS UE device. In some embodiments in which the UE is a dual mode of operation device it is also configured to generate messages for transmission to both wireless base stations using a first protocol (e.g., CBRS wireless protocol, 4G wireless protocol or 5G wireless protocol and to a Wi-Fi access point using a second wireless protocol, i.e., a Wi-Fi wireless protocol. The message processing component 806 is configured to process messages received from other devices, e.g., a wireless base station or a Wi-Fi Access Point. In some embodiments, the message processing component 806 is a sub-component of the communications component 808. The communications component 808 is configured to handle communications, e.g., receipt and transmission of signals and provide protocol signal processing for one or more protocols for the UE. The applications component 810 is configured to provide various application services for the UE device, e.g., voice over internet protocol calling services, video on demand services, media download services, conferencing services, internet access and web browsing services, etc. The dual mode of operation component 812 is an optional component which is present in dual mode operation devices that operate using two different wireless protocols. The dual mode of operation component 812 is configured to establish different transmission paths for receiving data packets using different wireless protocols (e.g., CBRS or 5G wireless protocol and Wi-Fi protocol) depending on the selection of the mode of operation e.g. The determination component 814 is responsible for making determinations at the user equipment device including for example the selection of the mode of operation (e.g., CBRS or 5G wireless protocol and Wi-Fi protocol). The storage component 816 controls the storage and retrieval of information and data in the memory of user equipment device.

Figure 9:
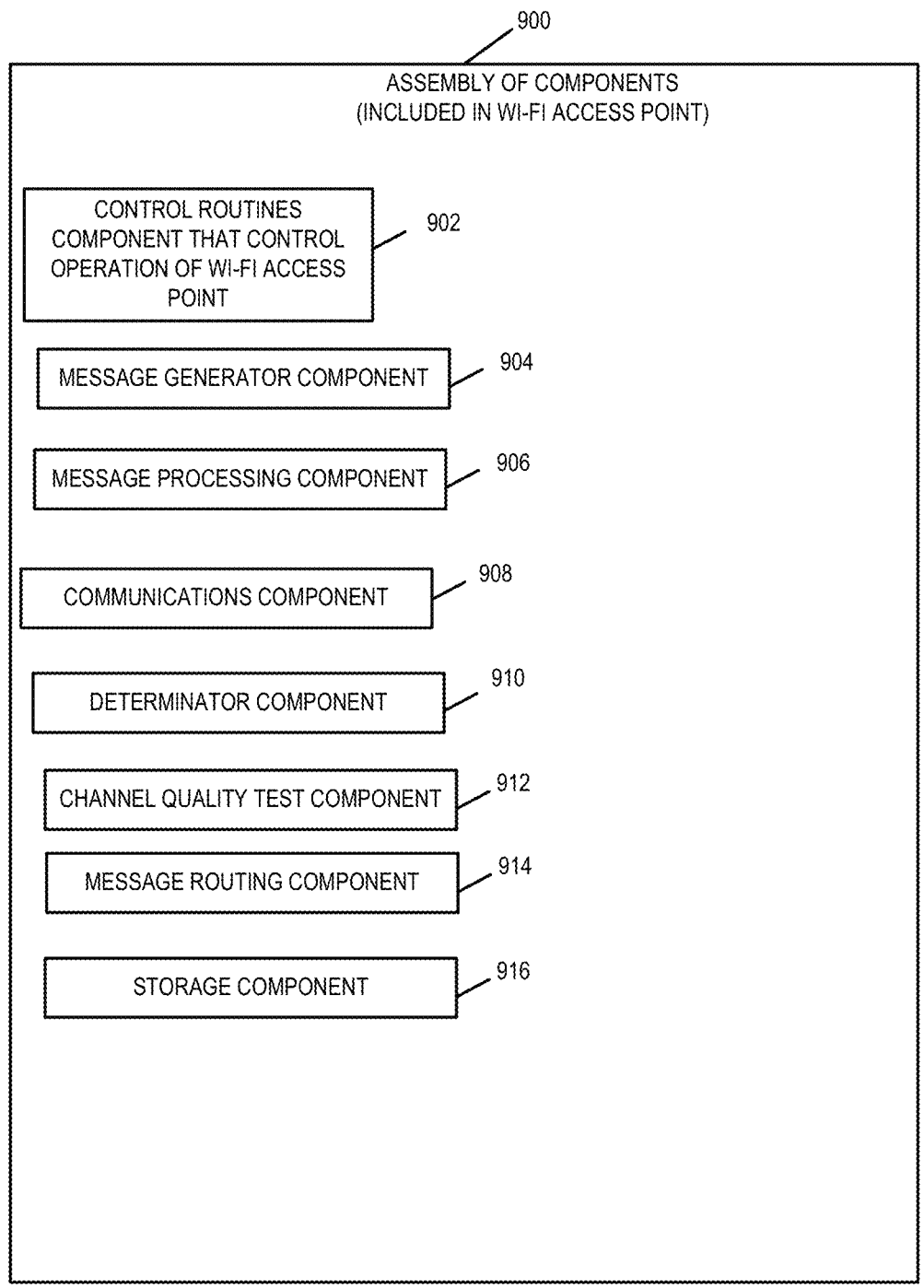
FIG. 9 illustrates an exemplary assembly of components for a Wi-Fi Access Point in accordance with an embodiment of the present invention.

FIG. 9 is a drawing of an exemplary assembly of components 900 which may be included in an exemplary Wi-Fi Access Point, e.g., exemplary Wi-Fi Access Point 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the Wi-Fi Access Point 600, with the components controlling operation of Wi-Fi Access Point 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the Wi-Fi Access Point 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, a message processing component 906, a communications component 908, a determinator component 910, channel quality test component 912, a message routing component 914 and a storage component 916.

The control routines component 902 is configured to control operation of the Wi-Fi Access Point. The message generator component 904 is configured to generate messages for transmission to a CPE device and user equipment devices. The message processing component 906 processes received messages and takes actions based on the processed messages. The communications component 908 is configured to handle communications between the Wi-Fi Access Point and other devices, e.g., CPE device and user equipment devices. The determinator component 910 makes determinations for the Wi-Fi Access Point including which UE devices are to be provided services and which are not. The channel quality test component 912 performs communications channel, e.g., Wi-Fi channels/connections, quality and signaling condition tests. The message routing component 914 routes messages received at the Wi-Fi Access Point toward their intended destinations. The storage component 916 is responsible for the storage and retrieval of data and information in the memory of the Wi-Fi Access Point.

Figure 10:
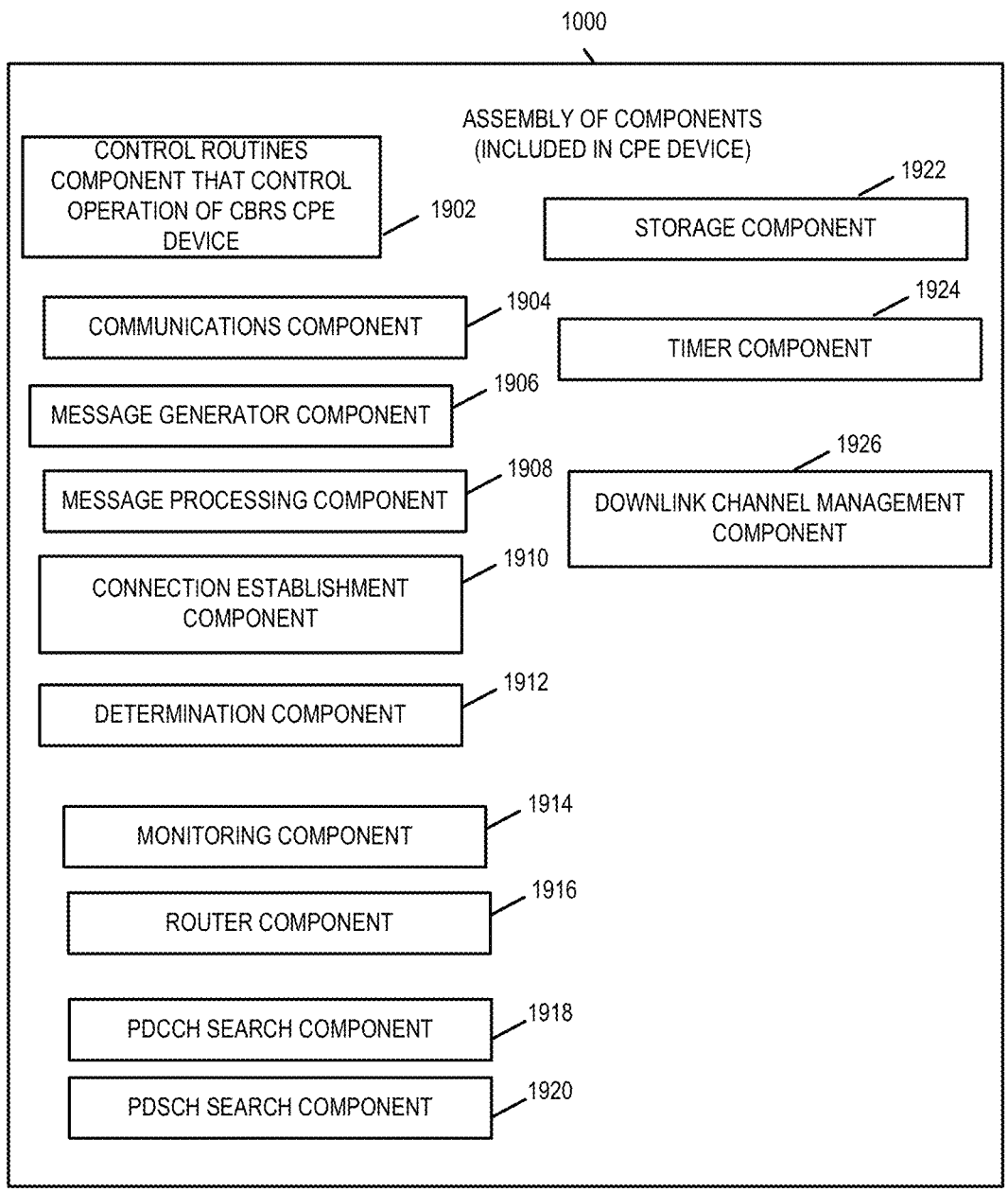
FIG. 10 illustrates an exemplary assembly of components for a customer premises equipment (CPE) device, e.g., CBRS CPE device, in accordance with an embodiment of the present invention.

FIG. 10 is a drawing of an exemplary assembly of components 1000 which may be included in an exemplary CPE device, e.g., exemplary CPE device 300 of FIG. 3, in accordance with an exemplary embodiment. The components in the assembly of components 1000 can, and in some embodiments are, implemented fully in hardware within a processor, e.g., processor 306, e.g., as individual circuits. The components in the assembly of components 1000 can, and in some embodiments are, implemented fully in hardware within the assembly of hardware components 308, e.g., as individual circuits corresponding to the different components. In other embodiments some of the components are implemented, e.g., as circuits, within processor 306 with other components being implemented, e.g., as circuits within assembly of components 308, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 312 of the CPE device 300, with the components controlling operation of CPE device 300 to implement the functions corresponding to the components when the components are executed by a processor e.g., processor 306. In some such embodiments, the assembly of components 1000 is included in the memory 312 as assembly of software components 314. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 1000 is stored in the memory 312, the memory 312 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the CPE device 300 or elements therein such as the processor 306, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method.

Assembly of components 1000 includes a control routines component 1902, a communications component 1904, message generator component 1906, a message processing component 1908, a connection establishment component 1910, a determination component 1912, a monitoring component 1914, a router component 1916, a Physical Downlink Control Channel (PDCCH) search component 1918, and Physical Downlink Shared Channel (PDSCH) search component 1920, a storage component 1922, a timer component 1924, and a downlink channel management component 1926.

The control routines component 1902 controls the operation of the CPE device. The communications component 1904 performs operations for handling communications with other devices including generation, transmission, receiving, and processing messages, establishing connections, signal processing for different communications protocols. The message generator component 1906 generates messages and signals, e.g., messages/signals to be sent to the Wi-Fi access points, UE devices, wireless base station including request signals/message, notification signals and response/acknowledgement messages. In some embodiments, the message generator component 1906 is a sub-component of communications component 1904. The message processing component 1908 processes received messages and performs operations in response to received messages.

The connection establishment component 1910 handles establishment and termination of communications connections, e.g., device to device communications connections between the wireless base station and the CPE device and the CPE device and the Wi-Fi Access Points. In some embodiments, the connection establishment component 1910 is a sub-component of communications component 1904.

The determination component 1912 makes various determinations for the CPE device such as where the data for the CPE device is located in the PDSCH channel based on downlink control information received from the wireless base station, where the downlink control information for the CPE device is located in the PDCCH channel, whether to switch from operating in a first CPE device mode of operation to a second CPE device mode of operation, whether to switch from operating in a second CPE device mode of operation to a first CPE device mode of operation, whether to search for downlink control information in the PDCCH channel, whether to search for data, e.g., user data in the PDCCH channel, whether to search for a data pattern indicating the CPE device is to switch operating modes, whether an amount of time has elapsed, whether the CPE device supports a mode of operation in which the CPE device does not search for and/or require downlink control information be provided in the PDCCH channel to operate for a predetermined period of time specified by the wireless base station.

The monitoring component 1914 monitors for various conditions and information e.g., a data pattern indicating that the CPE device is commence searching the PDCCH channel for downlink control information and/or that the CPE device is to switch modes of operation for example from a mode of operation in which the CPE device does not search for downlink control information in the PDCCH channel to a mode of operation in which the CPE device does search for downlink control information in the PDCCH channel. The router component 1916 routes received messages to destination devices or to the next hop on the path to the destination. The PDCCH search component 1918 searches the PDCCH channel for information communicated to the CPE device from the wireless base station. The PDSCH search component 1920 searches the PDSCH channel to identify data, e.g., user data, communicated from the wireless base station to the CPE device using location information provided to the CPE, e.g., frequency and time information which maps to a location in PDSCH channel. The storage component 1922 is responsible for the management of the storage and retrieval of data and information in the memory of the CPE device. The timer component 1924 is a timer that is used to track time, e.g., an amount of time during which the CPE device is to operate in a second mode of operation in which it does not search for downlink control information in the PDCCH channel. The downlink channel management component 1926 manages the PDCCH and PDSCH channels including for example searching for, identifying and reading downlink control information and/or data, e.g., user data, that is communicated over the downlink channels to the CPE device. In some embodiments, the downlink channel management component 1926 also manages communications with the wireless base station in connection with the downlink channels such as receiving downlink control information, determining the CPE devices mode of operation with respect to the downlink channels, e.g., PDCCH mode of operation (also referred to as a first CPE device mode of operation) or no PDCCH mode of operation (also referred to as the second CPE device mode of operation), and when to switch modes of operations.

Figure 2A:
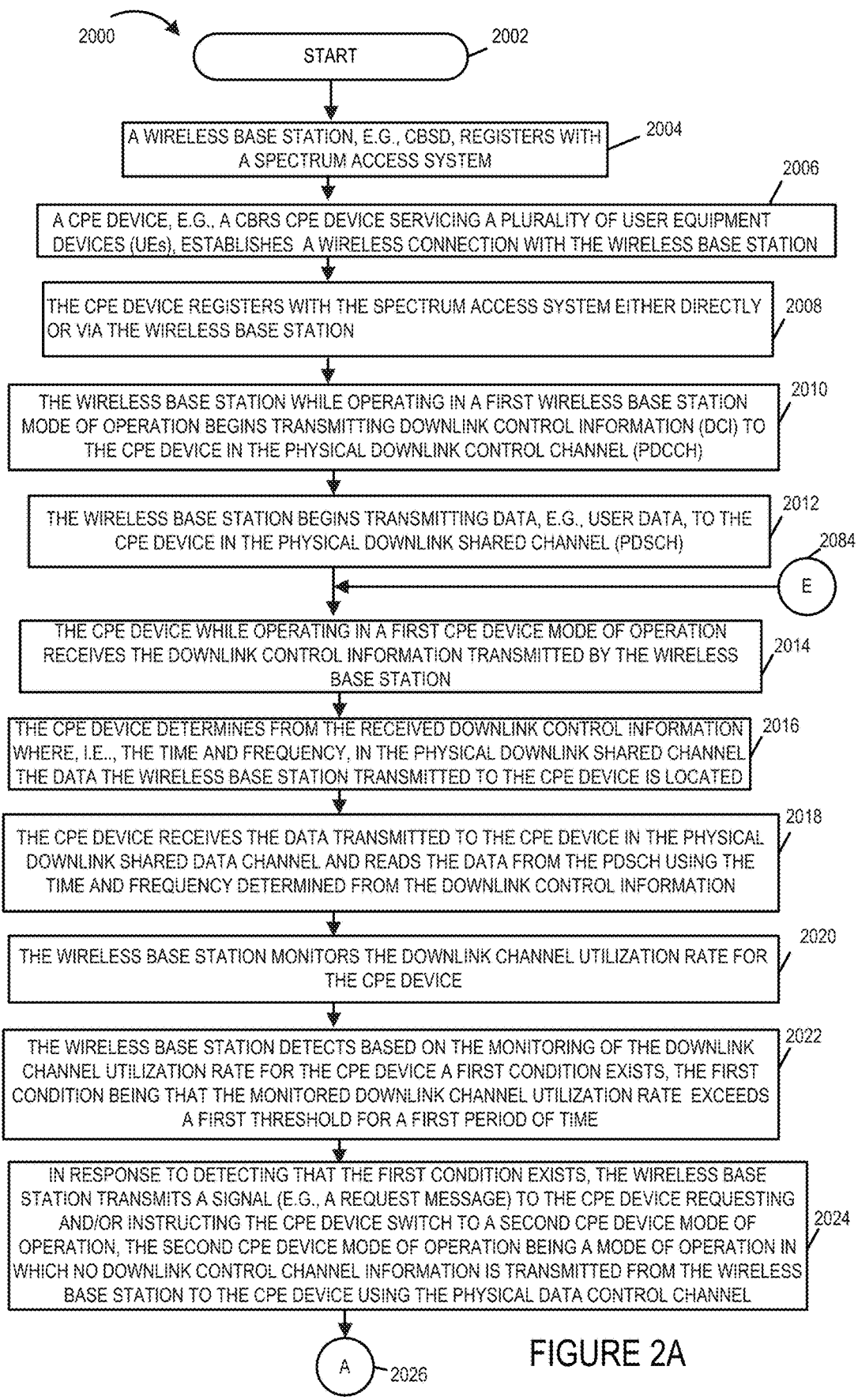
FIG. 2A illustrates the steps of the first part of an exemplary method in accordance with one embodiment of the present invention.
Figure 2C:
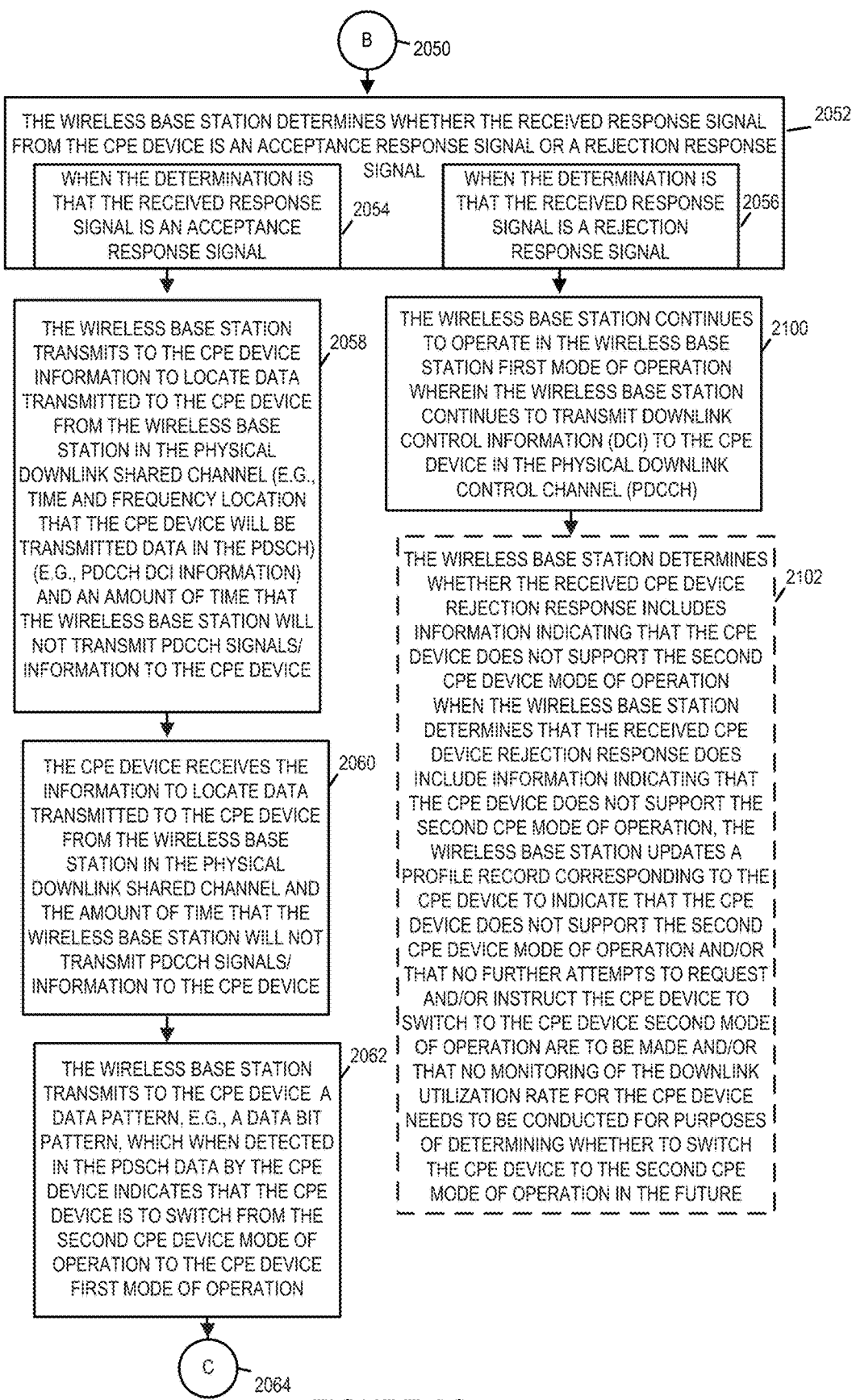
FIG. 2C illustrates the steps of the third part of an exemplary method in accordance with one embodiment of the present invention.
Figure 2D:
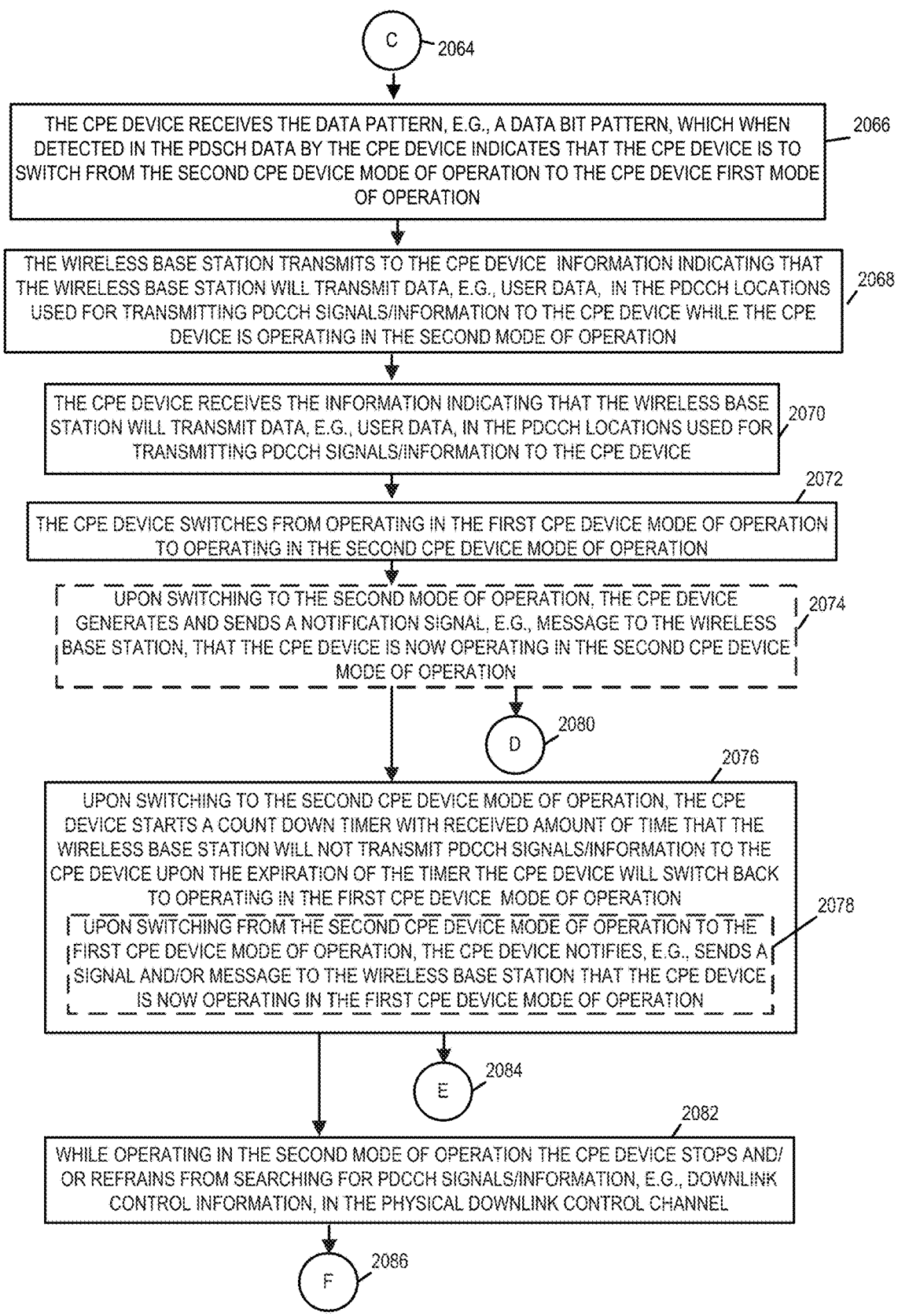
FIG. 2D illustrates the steps of the fourth part of an exemplary method in accordance with one embodiment of the present invention.

FIG. 2, which comprises the combination of FIGS. 2A, 2B, 2C, 2D, 2E and 2F illustrates an exemplary method 2000. FIG. 2A illustrates the steps of the first part of an exemplary method 2000 in accordance with one embodiment of the present invention. FIG. 2B illustrates the steps of the second part of an exemplary method 2000 in accordance with one embodiment of the present invention. FIG. 2C illustrates the steps of the third part of an exemplary method 2000 in accordance with one embodiment of the present invention. FIG. 2D illustrates the steps of the fourth part of an exemplary method 2000 in accordance with one embodiment of the present invention. FIG. 2E illustrates the steps of the fifth part of an exemplary method 2000 in accordance with one embodiment of the present invention. FIG. 2F illustrates the steps of the sixth part of an exemplary method 2000 in accordance with one embodiment of the present invention.

For explanatory purposes the exemplary method 2000 will be explained in connection with the exemplary communications system 100 illustrated in FIG. 1 although it should be understand that the method may be implemented using other systems and other system configurations then those illustrated in FIG. 1. While it will be readily understood that additional steps and signaling are performed in connection with communicating information, messages, and packets between devices, the method 2000 focuses on and discusses the steps and signaling for understanding the invention.

The method 2000 shown in FIG. 2 will now be discussed in detail. The method starts in start step 2002 shown on FIG. 2A with the devices in system 100 being initialized and becoming operational. Operation proceeds from step 2002 to step 2004.

In step 2004, a wireless base station, e.g., CBSD 1 102 of system 100, registers with a spectrum access system, e.g., SAS 1 110, and obtains frequency spectrum in 3.5 GHz bandwidth to use for communicating with devices in a first wireless protocol format, e.g., a 5G wireless protocol format, CBRS wireless protocol packet format, or a cellular wireless protocol format. Operation proceeds from step 2004 to step 2006.

In step 2006, a customer premises equipment device, e.g., CBRS CPE device 1 112 of system 100, which is servicing one or more user equipment devices (e.g., UE 1 116, UE 2 118, UE 3 119, . . . , UE M 120, establishes a wireless connection with the wireless base station. Operation proceeds from step 2006 to step 2008.

In step 2008, the CPE device, e.g., CPE device 1 112, registers with the spectrum access system, e.g., SAS 1 110, either directly or via the wireless base station wherein the wireless base station transmits CPE device registration information to the spectrum access system for CPE devices attached or connected to the wireless base station. Operation proceeds from step 2008 to step 2010.

In step 2010, the wireless base station while operating in a first mode of operation beings transmitting downlink control information (DCI) to the CPE device in the physical downlink control channel (PDCCH). The downlink control information includes location information (e.g., the time and frequency) in the Physical Downlink Shared Channel at which data transmitted by the wireless base station to the CPE device will be located. The downlink control information provided via the Physical Downlink Control Channel includes scheduling assignments for the time and frequency of the Physical Downlink Shared Channel at which the data for the CPE device is located. This location information is used as a pointer to show the location of the Physical Downlink Shared Channel (PDSCH) in the resource grid (time and frequency resource map) where the data, e.g., user data, transmitted from the wireless base station to the CPE device will be located in the Physical Downlink Shared Channel. The downlink control information transmitted to the CPE device in the Physical Downlink Control Channel in at least some embodiments includes the information that informs the CPE device at which time and frequency the data that is sent to the CPE device from the wireless base station is located in the Physical Downlink Shared Channel. Operation proceeds from step 2010 to step 2012.

In step 2012, the wireless base station begins transmitting data, e.g., user data to the CPE device in the physical downlink shared channel (PDSCH) at the location identified by the downlink control information transmitted to the CPE device in the Physical Downlink Control Channel in step 2010. Operation proceeds from step 2012 to step 2014.

In step 2014, the CPE device while operating in a first CPE device mode of operation receives the downlink control information transmitted by the wireless base station in the PDCCH channel. In some embodiments, step 2014 is performed prior to step 2012. In some such embodiments, the CPE device transmits an acknowledgement to the wireless base station that it has received the downlink control information to the wireless base station and upon receipt of the acknowledgement the wireless base station begins transmitting data as described in step 2012. Operation proceeds from step 2014 to step 2016.

In step 2016, the CPE device determines from the received downlink control information the location, i.e., the time and frequency, in the physical downlink shared channel where the data, e.g., user data, the wireless base station transmitted to the CPE device is located. Operation proceeds from step 2016 to step 2018.

In step 2018, the CPE device receives the data transmitted to the CPE device in the Physical Downlink Shared Data Channel and reads the data from the Physical Downlink Shared Channel using the location information, e.g., the frequency and time information, determined from the downlink control information. Operation proceeds from step 2018 to step 2020.

In step 2020, the wireless base station monitors the downlink channel utilization rate for the CPE device. Operation proceeds from step 2020 to step 2022.

In step 2022, the wireless base station detects based on the monitoring of the downlink channel utilization rate for the CPE device a first condition exists. The first condition being that the monitored downlink channel utilization rate exceeds a first threshold for a first period of time. Operation proceeds from step 2022 to step 2024.

In step 2024, in response to detecting that the first condition exists, the wireless base station transmits a signal (e.g., a request message) to the CPE device requesting and/or instructing the CPE device switch to a second mode of operation. The second mode of operation being a mode of operation in which no downlink control information is transmitted to the CPE device from the wireless base station using the Physical Data Control Channel. Operation proceeds from step 2024 to step 2028 shown on FIG. 2B via connection node A 2026.

In step 2028, the CPE device receives the transmitted signal from the wireless base station requesting and/or instructing the CPE device switch to the second CPE device mode of operation. Operation proceeds from step 2028 to step 2030.

In step 2030, the CPE device in response to receiving the transmitted signal requesting and/or instructing the CPE device switch to the second CPE device mode of operation determines whether it will accept or reject the request and/or instruction to switch to the second CPE device mode of operation. In some embodiments, step 2030 include sub-step 2032. In sub-step 2032, the CPE device makes the determination as to whether to accept or reject the request and/or instruction to switch to the second CPE device mode of operation based on whether the CPE device supports the second mode of operation. When the CPE device supports the second mode of operation, the CPE device makes a determination to accept the request and/or instruction and when the CPE device does not support the second mode of operation the CPE device makes a determination to reject the request and/or instruction to switch to the second CPE device mode of operation. Step 2030 includes sub-steps 2034 and 2036.

In sub-step 2034, the CPE device determines it will accept the request and/or instruction to switch to the second CPE device mode of operation.

In sub-step 2036, the CPE device determines it will reject the request and/or instruction to switch to the second CPE device mode of operation.

When the CPE device determines to accept the request and/or instruction to switch to the second CPE device mode of operation, operation proceeds from sub-step 2034 of step 2030 to step 2038.

When the CPE device determines to reject the request and/or instruction to switch to the second CPE device mode of operation, operation proceeds from sub-step 2036 of step 2030 to step 2042.

In step 2038, the CPE device generates an acceptance response signal, e.g., an acceptance message. Operation proceeds from step 2038 to step 2040.

In step 2040, the CPE device transmits the acceptance response signal to the wireless base station. Operation proceeds from step 2046 to step 2048.

Returning to step 2030, when the CPE device determines to reject the request and/or instruction to switch to the second CPE device mode of operation, operation proceeds from sub-step 2036 of step 2030 to step 2042. In step 2042, the CPE device generates a rejection response signal, e.g., a rejection message. In some embodiments, step 2042 includes optional sub-step 2044. In sub-step 2044, the CPE device generates a rejection response signal, e.g., a rejection message which includes information specifying whether or not the CPE device supports operating in the second CPE device mode of operation. Operation proceeds from step 2042 to step 2046.

In step 2046, the CPE device transmits the rejection response signal to the wireless base station. Operation proceeds from step 2046 to step 2048.

In step 2048, the wireless base station receives the response signal transmitted from the CPE device. Operation proceeds from step 2048 via connection node B 2050 to step 2052 shown on FIG. 2C.

In step 2052, the wireless base station determines whether the response signal received from the CPE device is an acceptance response signal or a rejection response signal. Step 2052 includes sub-steps 2054 and 2056. In sub-step 2054, when the CPE device makes the determination that the received response signal is an acceptance response signal operation proceeds from sub-step 2054 of step 2052 to step 2058. In sub-step 2056, when the CPE device makes the determination that the received response signal is a rejection response signal operation proceeds from sub-step 2056 of step 2052 to step 2100.

In step 2100, the wireless base station continues to operate in the wireless base station first mode of operation wherein the wireless base station continues to transmit downlink control information (DCI) to the CPE device in the Physical Downlink Control Channel (PDCCH). Operation proceeds from step 2100 to option step 2110.

In optional step 2110, the wireless base station determines whether the received CPE device rejection response includes information indicating that the CPE device does not support the second CPE device mode of operation. When the wireless base station determines that the CPE device does not support the second CPE device mode of operation, the wireless base station updates a profile record corresponding to the CPE device to indicate that the CPE device does not support the second CPE device mode of operation and/or that no further attempts to request and/or instruct the CPE device to switch to the second CPE device mode of operation are to be made and/or that no monitoring of the downlink utilization rate for the CPE device needs to be conducted for purposes of determining whether to switch the CPE device to the second CPE device mode of operation. In this situation, wireless base station continues to operate in the wireless base station mode of operation as described in connection with step 2100.

Optionally, when the wireless base station determines that the CPE device does support the second CPE device mode of operation but for example has rejected the request for another reason, operation proceeds from optional step 2102 via connection node E to step 2014 shown on FIG. 2A where operation continues as previously described. However, in step 2022 the monitoring for the first time period is reset so that the first condition only exists after the wireless base station detects that the downlink channel utilization rate for the CPE device exceeds the first threshold for another first time period.

In step 2058, the wireless base station transmits to the CPE device information to locate data transmitted from the wireless base station in the physical downlink shared channel (e.g., the time and frequency location that the CPE device will be transmitted data in the PDSCH channel). For example, the wireless base station transmits downlink control information in the PDCCH channel to the CPE device. The downlink control information including an amount of time that the wireless base station will not transmit PDCCH signals/information to the CPE device. This is also the amount of time the Physical Downlink Control Channel will not be used by the wireless base station to transmit downlink control channel information to the CPE device. Operation proceeds from step 2058 to step 2060.

In step 2060, the CPE device receives the information (time and frequency information) to locate data transmitted to the CPE device from the wireless base station in the Physical Downlink Shared Channel and the amount of time that the wireless base station will not transmit PDCCH signals/information to the CPE device. The information to locate the data transmitted to the CPE device in the Physical Downlink Shared Channel and the amount of time the wireless base station will not transmit PDCCH signals/information to the CPE device may be, and typically is, included in a final transmission of downlink control information transmitted to the CPE device using the Physical Downlink Control Channel prior to the wireless base station and CPE device entering their second modes of operation during which the wireless base station does not transmit the PDCCH control information to the CPE device using the PDCCH channel. Operation proceeds from step 2060 to step 2062.

In step 2062, the wireless base station transmits to the CPE device a data pattern, e.g., a data bit pattern or sequence of data bits of fixed length, which when detected by the CPE device in the Physical Downlink Shared Channel data transmitted by the wireless base station to the CPE device indicates to the CPE device that the CPE device is to switch from the second CPE device mode of operation to the CPE device first mode of operation. The CPE device first mode of operation being a mode of operation in which the CPE device searches the Physical Downlink Control Channel for transmissions from the wireless base station. The wireless base station using the Physical Downlink Control Channel for providing the CPE device downlink control information. Operation proceeds from step 2062 via connection node C 2064 to step 2066 shown on FIG. 2D.

In step 2066, the CPE device receives the data pattern, e.g., a data bit pattern or sequence of data bits of fixed length, which when detected by the CPE device in the Physical Downlink Shared Channel data transmitted by the wireless base station to the CPE device indicates to the CPE device that the CPE device is to switch from the second CPE device mode of operation to the CPE device first mode of operation. The CPE device stores this data pattern in memory for later use in monitoring the data received in the Physical Downlink Shared Channel data during the time period the CPE device is operating in the second CPE device mode of operation. In most, but not all, embodiments, this information is transmitted from the wireless base station to the CPE device in the downlink control information transmitted to the CPE device using the PDCCH before the wireless base station and the CPE device switch to operating in their second modes of operation. Operation proceeds from step 2066 to step 2068.

In step 2068, the wireless base station transmits to the CPE device information indicating that the wireless base station will transmit data, e.g., user data normally transmitted in the Physical Downlink Shared Channel to the CPE device in the PDCCH locations normally used for sending PDCCH signals/information such as for example downlink control information. In this way, the wireless base station will be able to improve the downlink data throughout to the CPE device. The information indicating that the wireless base station will transmit data to the CPE using the PDCCH locations is in most, but not all, embodiments, transmitted from the wireless base station to the CPE device in the downlink control information transmitted to the CPE device using the PDCCH before the wireless base station and the CPE device switch to operating in their second modes of operation. Operation proceeds from step 2068 to step 2070.

In step 2070, the CPE device receives the information indicating that the wireless base station will transmit data, e.g., user data normally transmitted in the Physical Downlink Shared Channel to the CPE device in the PDCCH locations normally used for sending PDCCH signals/information such as for example downlink control information. Operation proceeds from step 2070 to step 2072.

In some embodiments, the CPE device sends one or more acknowledgement signals or messages to the wireless base station to notify the wireless base station of each signal and/or message it receives from the wireless base station. The wireless base station upon receiving the acknowledgement signals or messages is then able to determine that the CPE device has received its signals/messages, e.g., the signals and/or messages regarding switching from the first CPE device mode of operation where the PDCCH channel is used to communicate downlink control information to CPE device to the second CPE device mode of operation where the PDCCH channel is not used to communicate downlink control information to the CPE device but is used instead to send CPE data, e.g., user data to the CPE device.

In step 2072, the CPE device switches from operating in the first CPE device mode of operation to operating in the second CPE device mode of operation. Operation proceeds from step 2072 to optional step 2074. If optional step 2074 is not implemented operation proceeds from step 2072 to step 2076 and to step 2130 shown on FIG. 2F via connection node D 2080.

In optional step 2074, upon switching to the second CPE mode of operation, the CPE device generates and sends a notification signal, e.g., message, to the wireless base station notifying the wireless base station that the CPE device is now operating in the second CPE device mode of operation. Operation proceeds from optional step 2074 to step 2076 and to step 2130 shown on FIG. 2F via connection node D 2080.

In step 2076, upon switching to the second CPE device mode of operation, the CPE device starts a count down timer with the received amount of time that the wireless base station will not transmit PDCCH signals/information to the CPE device. Upon the expiration of the timer, that is when the received specified amount of time has elapsed, the CPE device will switch back to operating in the first CPE device mode of operation. In some embodiments, step 2076 includes sub-step 2078. In sub-step 2078 upon switching from the second CPE device mode of operation to the first CPE device mode of operation, the CPE device notifies, e.g., sends a signal and/or message, to the wireless base station that the CPE device is now operating in the first CPE device mode of operation. Operation proceeds from step 2076 to step 2082 and via connection node E 2084 to step 2014 shown on FIG. 2A where processing continues as previously described.

In step 2082, while operating in the second CPE device mode of operation the CPE device stops and/or refrains from searching for PDCCH signals and/or information, e.g., downlink control information, in the Physical Downlink Control Channel. Operation proceeds from step 2082 via connection node F 2086 to step 2088 shown on FIG. 2E.

In step 2088, while operating in the second CPE device mode of operation, the CPE device searches for and receives data, e.g., user data, from the wireless base station at the location(s) in the Physical Downlink Shared Channel (e.g., time and frequency) identified by the wireless base station where the downlink data for the CPE device would be located for the amount of time specified as discussed in step 2060. Operation proceeds from step 2088 to step 2090.

In step 2090, while operating in the second CPE device mode of operation, the CPE device searches for and receives data, e.g., user data, at the PDCCH location (time and frequency) previously used while operating in the first CPE device mode for receiving PDCCH signals and/or information, e.g., downlink control information, for the CPE device. Operation proceeds from step 2090 to step 2092.

In step 2092, while operating in the second CPE device mode of operation, the CPE device monitors the data, e.g., user data, received from the wireless base station for the data pattern, e.g., data bit pattern, indicating that the CPE device is to switch from operating in the second CPE device mode of operation to operating in the first CPE device mode of operation. When the CPE device detects the data pattern in the received data while operating in the second CPE device mode of operation, the CPE device switches from the second CPE device mode of operation to the first CPE device mode of operation. In some embodiments, step 2092 includes sub-step 2094. In sub-step 2094, upon switching from the second CPE device mode of operation to the first CPE device mode of operation, the CPE device notifies, e.g., sends a signal and/or message, to the wireless base station indicating that the CPE device is now operating in the first CPE device mode of operation. Operation proceeds from step 2092 via connection node E 2084 to step 2014 shown on FIG. 2A where processing continues as previously described.

In optional step 2130, the wireless base station receives the optional notification that the CPE device is now operating in the second CPE device mode of operation. Operation proceeds from step 2130 to step 2132. In embodiments in which the CPE device does not send notification messages indicating the CPE device's mode of operation, step 2130 is skipped and operation proceeds directly to step 2132.

In step 2132, the wireless base station switches from operating in the first wireless base station mode of operation to operating in the second wireless base station mode of operation. Operation proceeds from step 2132 to step 2134.

In step 2134, upon switching to the second wireless base station mode of operation, the wireless base station starts a count down timer with the amount of time that the wireless base station indicated to the CPE device it will not transmit PDCCH signals/information to the CPE device and upon the expiration of the timer the wireless base station will switch back to operating in the first wireless base station mode of operation. Operation proceeds from step 2134 to step 2014 shown on FIG. 2A via connection node E 2084 when the wireless base station switches from the operating in the second wireless base station mode of operation to operating in the first wireless base station mode of operation. While operating in the second wireless base station mode of operation and after the start of the counter timer, operation proceeds from step 2134 to step 2136.

In step 2136, while operating in the second wireless base station mode of operation, the wireless base station stops and/or refrains from sending PDCCH signals/information, e.g., downlink control information, in the Physical Downlink Control Channel to the CPE device. Operation proceeds from step 2136 to step 2138.

In step 2138, while operating in the second wireless base station mode of operation, the wireless base station transmits data, e.g., user data, to the CPE device in the Physical Downlink Shared Channel at a fixed location (time and frequency), the fixed location being the location specified to the CPE device in the information transmitted to the CPE device prior to switching to the second wireless base station mode of operation, e.g., in the final PDCCH signal/information, e.g., downlink control information, transmitted by the wireless base station to the CPE device prior to switching to the second mode of operation. Operation proceeds from step 2138 to step 2140.

In step 2140, while operating in the second wireless base station mode of operation, the wireless base station transmits data, e.g., user data such as the data normally transmitted in the PDSCH, in the Physical Downlink Control Channel instead of PDCCH signals/information to the CPE device, e.g., using the PDCCH locations to send data to the CPE device and/or other CPE device(s) instead of the PDCCH signals/information. Operation proceeds from step 2140 to step 2142.

In step 2142, while operating in the second wireless base station mode of operation, the wireless base station monitors the downlink channel utilization rate for the CPE device to detect if a second condition exists. Operation proceeds from step 2142 to step 2144.

In step 2144, if and/or when the wireless base station detects while operating in the second wireless base station mode of operation based on the monitoring of the downlink channel utilization rate for the CPE device that the second condition exists, then the wireless base station: (i) transmits to the CPE device the data pattern, e.g., data bit patter, indicating that the CPE device is to switch from operating in the second CPE device mode of operation to operating in the first CPE device mode of operation; and (ii) the wireless base station switches from operating in the second wireless base station mode of operation to operating in the first wireless base station mode of operation. Operation proceeds from step 2144 via connection node E 2084 to step 2014 shown on FIG. 2A wherein method 200 proceeds as previously discussed.

In some embodiments, the second condition is that the downlink channel utilization rate for the CPE device exceeds a second threshold value for a continuous period of time. For example, if the downlink utilization rate triples for a continuous period of time e.g., 5 minutes, then the wireless base station may experiencing a buffering issue therefore to alleviate the situation would switch to the first wireless base station mode of operation where additional physical downlink shared channel bandwidth could be assigned to the CPE device. In some other embodiments, the second condition is that the downlink channel utilization rate for the CPE device is less than or equal to a second threshold value for a continuous period of time. For example, if the downlink channel utilization rate for the CPE device drops by 90% for a 5 minute period, the wireless base station may be programmed to switch back to the first wireless base station mode of operation so that the physical downlink shared channel bandwidth dedicated to the CPE device as it is a fixed amount may be reassigned to other CPE devices so the use of the physical downlink shared channel bandwidth is efficiently utilized and not wasted.

In some embodiments, an amount of time for the CPE device to remain in the second CPE device mode of operation is not communicated to the CPE device but instead the CPE device remains in the second mode of operation until it detects the unique data pattern indicating that the CPE device is to switch from the second CPE device mode of operation back to the first CPE device mode of operation in which the PDCCH channel is once again searched by the CPE device for downlink channel control information.

In some embodiments of method 2000, the amount of channel capacity and/or spectrum and/or bandwidth allocated to the first CPE device is fixed for the PDSCH channel.

The method 2000 provides the technological solution of how to efficiently manage downlink channels between wireless base stations and customer equipment devices to efficiently utilize the downlink channels and/or bandwidth/spectrum to provide data, e.g., user data, to CPE devices located at customer premises. While method 2000 is directed to a single CPE device, the method is also applicable to multiple CPE devices being serviced by the wireless base station. In such embodiments, the wireless base station uses the method 2000 with respect to each of the CPE devices to which it is providing services. Table 1200 illustrated in FIG. 12 shows the wireless base station CPE device records and related information for an exemplary implementation of the method 2000 with respect to four CPE devices. Table 1200' illustrated in FIG. 13 illustrates another exemplary embodiment in which the wireless base station requests/instructs the four CPE devices it is servicing to enter the second mode of operation (i.e., the no PDCCH mode of operation) concurrently or at the same time so as to reduce the overhead of the wireless base station's management of the different CPE devices. Table 1200 and Table 1200' are discussed in further detail below.

In some embodiments, the wireless base station only supports CPE devices wherein the CPE devices are non-mobile CPE devices and the wireless base station does not simultaneously or concurrently directly provide services to mobile terminals or user equipment devices, i.e., it does not communicate directly with mobile terminals or user equipment devices.

Figure 11:
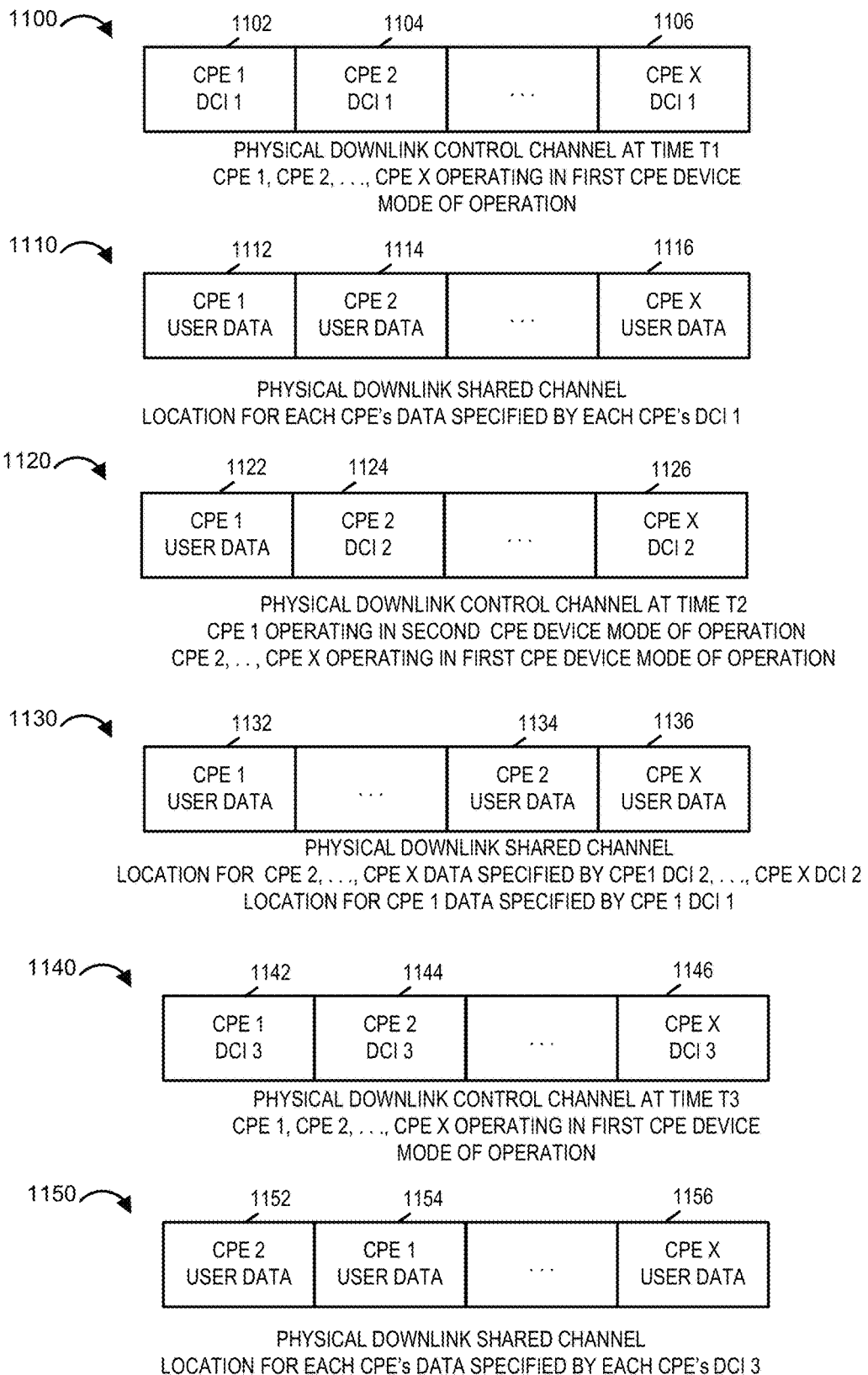
FIG. 11 illustrates exemplary Physical Downlink Control Channels and Physical Downlink Shared Channels in accordance with an embodiment of the present invention.

FIG. 11 illustrates an exemplary physical downlink control channel and corresponding physical downlink shared channel at different times T1, T2 and T3 in accordance with an exemplary embodiment of the present invention. The physical downlink control channel and physical downlink shared channel have been simplified for explanatory purposes.

The physical downlink control channel 1100 depicts a physical downlink control channel at a first time T1 with time slots 1102, 1104, . . . , 1106 corresponding to CPE device 1 112, CPE device 2 152, . . . , CPE device X 158 respectively from system 100. During time T1 CPE device 1, CPE device 2, . . . , CPE device X are all operating in a first CPE device mode of operation wherein the CPE devices search for and obtain downlink control information from the Physical Downlink Control Channel. In Physical Downlink Control Channel 1100, time slot 1102 includes CPE device 1 112 downlink control information (DCI) 1 for time T1, time slot 1104 includes CPE device 2 152 downlink control information (DCI) 1 for time T1, . . . , time slot 1106 includes CPE X downlink control information (DCI) 1 for time T1. The wireless base station 102 from system 100 at time T1 is operating in the first wireless base station mode of operation and communicated the CPE device downlink control information to the CPE devices it is servicing (CPE device 1 112, CPE device 2 152, . . . , CPE device X 158) via the Physical Downlink Control Channel.

Physical Downlink Shared Channel 1110 illustrates a Physical Downlink Shared Channel with time slots 1112, 1114, . . . , 1116, carrying data, e.g., user data, for CPE device 1 112, CPE device 2 152, . . . , CPE device X 158 respectively. The CPE device 1 112 uses the location information (e.g., time and frequency information) in the CPE 1 DCI 1 information received in the PDCCH channel at time T1 to search for, locate, identify the time slot containing CPE 1 user data 1112 which the wireless base station has transmitted to the CPE device 1 112. Once the CPE device 1 112 locates the time slot 1112 containing the CPE 1 user data it can read the user data being communicated to it by the wireless base station. The CPE device 2 152 uses the location information (e.g., time and frequency information) in the CPE 2 DCI 1 information received in the PDCCH channel at time T1 to search for, locate, identify the time slot containing the CPE 2 user data 1114 which the wireless base station has transmitted to the CPE device 2 152. Once the CPE device 2 152 locates the time slot 1114 containing the CPE 2 user data it can read the user data being communicated to it by the wireless base station. The same process is used for the other CPE devices for example, CPE device X 158 uses the location information (e.g., time and frequency information) in the CPE X DCI 1 information received in the PDCCH channel at time T1 to search for, locate, identify the time slot containing the CPE X user data 1116 which the wireless base station has transmitted to the CPE device X 158. Once the CPE device X 158 locates the time slot 1116 containing the CPE X user data it can read the user data being communicated to it by the wireless base station.

The physical downlink control channel 1120 depicts a physical downlink control channel at a second time T2 with time slots 1122, 1124, . . . , 1126 corresponding to CPE device 1 112, CPE device 2 152, . . . , CPE device X 158 respectively from system 100. During time T2 CPE device 2, . . . , CPE device X are operating in a first CPE device mode of operation wherein the CPE devices search for an obtain downlink control information from the Physical Downlink Control Channel. CPE device 1 112 is operating in a second CPE device mode of operation in which the CPE device 1 112 does not search for or receive downlink control information in the Physical Downlink Control Channel. Instead the wireless base station uses the bandwidth of the Physical Downlink Control Channel to send user data to the CPE device 1 112 data which is typically communicated to the CPE device 1 112 via the Physical Downlink Shared Channel. In Physical Downlink Control Channel 1100, time slot 1122 includes CPE device 1 112 user data, time slot 1124 includes CPE device 2 152 downlink control information (DCI) 2 for time T2, . . . , time slot 1126 includes CPE X downlink control information (DCI) 2 for time T2. The wireless base station 102 from system 100 at time T2 is operating in the first wireless base station mode of operation with respect to CPE devices 2, ... X and communicated the CPE device downlink control information to these CPE devices via the Physical Downlink Control Channel. The wireless base station at time T2 is operating in a second wireless base station mode of operation at time T2 with respect to CPE device 1 112 and communicated user data to the CPE device in the time slot 1122 of the Physical Downlink Control Channel instead of downlink control information.

Physical Downlink Shared Channel 1130 illustrates a Physical Downlink Shared Channel with time slots 1132, ..., 1134, 1136, carrying data, e.g., user data, for CPE device 1 112, ..., CPE device 2 152, CPE device X 158 respectively. The CPE device 1 112 uses the location information (e.g., time and frequency information) in the CPE 1 DCI 1 information received in the PDCCH channel at time T1 to search for, locate, identify the time slot containing the CPE 1 user data 1122 which the wireless base station has transmitted to the CPE device 1 112. This is because when operating in the second CPE device mode of operation the CPE device location for receiving user data in the Physical Downlink Shared Channel remains fixed and does not change. In this case it remains at the same location as specified in the CPE 1 DCI 1 information which was the last location provided by the wireless base station to the CPE device 1 112. Once the CPE device 1 112 locates the time slot 1122 containing the CPE 1 user data it can read the user data being communicated to it by the wireless base station. The CPE device 2 152 uses the location information (e.g., time and frequency information) in the CPE 2 DCI 2 information received in the PDCCH channel at time T2 to search for, locate, identify the time slot containing the CPE 2 user data 1134 which the wireless base station has transmitted to the CPE device 2 152. Once the CPE device 2 152 locates the time slot 1134 containing the CPE 2 user data it can read the user data being communicated to it by the wireless base station. The same process is used for the other CPE devices for example, CPE device X 158 uses the location information (e.g., time and frequency information) in the CPE X DCI 2 information received in the PDCCH channel at time T2 to search for, locate, identify the time slot containing the CPE X user data 1136 which the wireless base station has transmitted to the CPE device X 158. Once the CPE device X 158 locates the time slot 1136 containing the CPE X user data it can read the user data being communicated to it by the wireless base station. It should be noted that the time slot 1134 is placed in a different position in the Physical Downlink Shared Channel to represent that it is at a different location (time and frequency) in the Physical Downlink Shared Channel than shown in Physical Downlink Shared Channel 1110. Furthermore, it should be understood that while the time slots have been shown as uniform in size the time slots may be, and typically are of different sizes depending on the amount of user data being transmitted to the CPE device. Furthermore, the time slot for a CPE device need not and typically is not a contiguous physical resource block of spectrum but is instead made of up of one or more physical resource blocks which are non-contiguous.

The physical downlink control channel 11400 depicts a physical downlink control channel at a third time T3 with time slots 1142, 1144, ..., 1146 corresponding to CPE device 1 112, CPE device 2 152, ..., CPE device X 158 respectively from system 100. In this example, the wireless base station at time T3 has switched back to operating in the second wireless base station mode of operation and the CPE device 1 112 has switched back to operating in the second CPE device mode of operation. During time T3 CPE device 1, CPE device 2, ..., CPE device X are all operating in the first CPE device mode of operation wherein the CPE devices search for and obtain downlink control information from the Physical Downlink Control Channel. In Physical Downlink Control Channel 1140, time slot 1142 includes CPE device 1 112 downlink control information (DCI) 3 for time T3, time slot 1144 includes CPE device 2 152 downlink control information (DCI) 3 for time T3, ..., time slot 1146 includes CPE X downlink control information (DCI) 3 for time T3. The wireless base station 102 from system 100 at time T3 is operating in the first wireless base station mode of operation and communicated the CPE device downlink control information to the CPE devices it is servicing (CPE device 1 112, CPE device 2 152, ..., CPE device X 158) via the Physical Downlink Control Channel.

Physical Downlink Shared Channel 1150 illustrates a Physical Downlink Shared Channel with time slots 1152, 1154, ..., 1156, carrying data, e.g., user data, for CPE device 2 152, CPE device 1 112, ..., CPE device X 158 respectively. The CPE device 1 112 uses the location information (e.g., time and frequency information) in the CPE 1 DCI 3 information received in the PDCCH channel at time T3 to search for, locate, identify the time slot containing the CPE 1 user data 1154 which the wireless base station has transmitted to the CPE device 1 112. Once the CPE device 1 112 locates the time slot 1154 containing the CPE 1 user data it can read the user data being communicated to it by the wireless base station. The CPE device 2 152 uses the location information (e.g., time and frequency information) in the CPE 2 DCI 3 information received in the PDCCH channel at time T3 to search for, locate, identify the time slot containing the CPE 2 user data 1152 which the wireless base station has transmitted to the CPE device 2 152. Once the CPE device 2 152 locates the time slot 1152 containing the CPE 2 user data it can read the user data being communicated to it by the wireless base station. The same process is used for the other CPE devices for example, CPE device X 158 uses the location information (e.g., time and frequency information) in the CPE X DCI 3 information received in the PDCCH channel at time T3 to search for, locate, identify the time slot containing the CPE X user data 1156 which the wireless base station has transmitted to the CPE device X 158. Once the CPE device X 158 locates the time slot 1156 containing the CPE X user data it can read the user data being communicated to it by the wireless base station. It should be noted that in this example the CPE 2 user data is contained in the first time slot 1152 of the Physical Downlink Shared Channel 1150 and the CPE 1 user data is contained in the second time slot 1154. This has been done to illustrate and emphasis that the location or time slot for the CPE device 1 112 is no longer fixed and once again is based on the downlink control information communicated by the wireless base station 102 to the CPE device 1 112 in the CPE 1 DCI 3 1142 information contained in the Physical Downlink Control Channel 1140. The switch from operating in the second mode of operation where no downlink control information is sent to the CPE device in the PDCCH and operating in the first mode of operation where downlink control information is sent in the PDCCH occurs at time T3 as a result of the wireless base station determining that the amount of time specified to the CPE device 1 112 to operate in the second CPE device mode of operation has elapsed or the wireless base station communicated a data pattern to the CPE device 1 112 in response to the wireless base station detecting a condition resulting in the switch to the first mode of operation. The data pattern indicating that the CPE device should switch to the first CPE device mode of operation and commence searching for downlink control information in the PDCCH.

Table 1200 includes columns 1202, 1204, 1206, 1208, 1210, 1212 and rows 1214, 1216, 1218, 1220, and 1222. This example is applicable to system 100 wherein there are four CPE devices within the wireless base station 102's coverage, for example when CPE device X=4. The first row 1214 includes labels identifying the information contained in the each of the columns. The entries in each of the rows (1214, 1216, 1218, 1220, 1222) of the table correspond to a single CPE device record. The entry (column 1202, row 1226) indicates that the entries in column 1202 include CPE Device ID. The entries in column 1204 indicate whether the CPE device supports a NO-PDCCH mode of operation (col. 1204, row 1214 entry). The entries in column 1206 indicate the current mode of operation of the CPE device (col. 1206, row 1214 entry). The entries in column 1208 are the amount of time until the wireless base station and the CPE device will switch back to PDCCH mode of operation (col. 1208, row 1214 entry). The entries in column 1210 are the current downlink channel utilization rate which is measure of rate of utilization of the downlink channel resources (e.g., physical resource blocks, bandwidth and/or spectrum) assigned to a CPE device by a wireless base station for downlink data communications actually being used as a percentage of what was assigned for usage (col. 1210, row 1214 entry). The entries in column 1212 are the amount of time downlink channel utilization rate for the CPE device has been above a first threshold value which in this example is 90% (col. 1212, row 1226 entry).

The information in row 1216 corresponds to CPE device 1. The information in row 1218 corresponds to CPE device 2. The information in row 1220 corresponds to CPE device 3. The information in row 1222 corresponds to CPE device 4.

The table 1200 in this example reflects the implementation of method 2000 by wireless base station 102 in connection with CPE devices 1, 2, 3, and 4. The table 1200 is stored in memory of the wireless base station. The first condition is that the downlink channel utilization rate exceeds 90% for a time period of 2 hours, i.e., 120 minutes). When downlink channel utilization rate has exceeded or been above 90% for a continuation period of time then the wireless base station through monitoring will detect that the first condition exists with respect to the CPE device. In this example, the CPE device needs to be above a 90% utilization rate for a continuous period of time of 2 hours for the first condition to be met. Upon the detection that the first condition is met with respect to a CPE device, the wireless base station will attempt to request and/or instruct that the CPE device enter the no PDCCH mode of operation which was referred to as the second CPE device mode of operation in method 2000 illustrated in FIG. 2. The mode of operation in which the PDCCH is used to communicate downlink control information to a CPE device was referred to as the first CPE device mode of operation and the first wireless base station mode of operation in method 2000. In this example, the amount of time that the wireless base station will instruct the CPE device to operate in the no-PDCCH mode of operation is 10 minutes. The fact that the amount of time until the switch back to PDCCH mode of operation is 5 minutes indicates that the CPE Device 1 has been operating in the no PDCCH mode of operation for 5 minutes already. Additional it indicates that since the amount of time downlink channel utilization rate has been above the first threshold value has been 3 hours, the CPE device may have been placed in the no-PDCCH mode several times over the last hour as the first CPE device met the first condition after 2 hours and has maintained the first condition for an additional hour.

Row 1216 indicates that CPE Device 1 supports a no-PDCCH mode of operation (row 1216, column 1204 entry), CPE Device 1 is currently operating in the no PDCCH mode of operation (also referred to as the second CPE device mode of operation in connection with method 2000) (row 1216, column 1206 entry), the amount of time until the CPE device switches back to the PDCCH mode of operation (referred to as the first CPE device mode of operation in connection with the method 2000) is 5 minutes (row 1216, column 1208 entry), the current downlink channel utilization rate for user data transmissions from the wireless base station to the CPE Device 1 is 100% (row 1216, column 1210 entry), and the amount of time the downlink channel utilization rate has been above a first threshold value which in this case is 90% has been 3 hours or 180 minutes.

Row 1218 indicates that CPE Device 2 supports a no-PDCCH mode of operation (row 1218, column 1204 entry), CPE Device 2 is currently operating in the no PDCCH mode of operation (also referred to as the second CPE device mode of operation in connection with method 2000) (row 1218, column 1206 entry), the amount of time until the CPE device switches back to the PDCCH mode of operation (referred to as the first CPE device mode of operation in connection with the method 2000) is 7 minutes (row 1218, column 1208 entry), the current downlink channel utilization rate for user data transmissions from the wireless base station to the CPE Device 1 is 95% (row 1218, column 1210 entry), and the amount of time the downlink channel utilization rate has been above a first threshold value which in this case is 90% has been 4 hours or 240 minutes.

Row 1220 indicates that CPE Device 3 supports a no-PDCCH mode of operation (row 1220, column 1204 entry), CPE Device 3 is currently operating in the PDCCH mode of operation (also referred to as the first CPE device mode of operation in connection with method 2000) (row 1220, column 1206 entry), the amount of time until the CPE device switches back to the PDCCH mode of operation (referred to as the first CPE device mode of operation in connection with the method 2000) is 0 minutes (row 1216, column 1208 entry) as it is currently operating in the PDCCH mode of operation, the current downlink channel utilization rate for user data transmissions from the wireless base station to the CPE Device 3 is 25% (row 1220, column 1210 entry), and the amount of time the downlink channel utilization rate has been above a first threshold value which in this case is 90% has been 0 hours as the current downlink channel utilization rate of 25% is currently below the 90% first threshold value.

Row 1222 indicates that CPE Device 4 supports does not support a no-PDCCH mode of operation (row 1222, column 1204 entry), CPE Device 4 is currently operating in the PDCCH mode of operation (also referred to as the first CPE device mode of operation in connection with method 2000) (row 1222, column 1206 entry), the amount of time until the CPE device switches back to the PDCCH mode of operation (referred to as the first CPE device mode of operation in connection with the method 2000) is 0 minutes (row 1222, column 1208 entry) as it is currently operating in the PDCCH mode of operation, the current downlink channel utilization rate for user data transmissions from the wireless base station to the CPE Device 4 is 96% (row 1222, column 1210 entry), and the amount of time the downlink channel utilization rate has been above a first threshold value which in this case is 90% has been 5 hours. It should be understand that even though the CPE device 4 mets the criteria for the first condition at which point the CPE device 4 could be requested or instructed to switch into the no-PDCCH mode of operation, the CPE device 4 does not support the no-PDCCH mode of operation and so the CPE device 4 remains operating in the PDCCH mode of operation. In some embodiments, the wireless base station may cease tracking the current downlink channel utilization rate and amount of time the downlink channel utilization rate has been above a first threshold value for the CPE device 4 until determining the CPE device 4 does not support a no-PDCCH mode of operation.

Table 1200' shown in FIG. 13 includes columns 1202, 1204', 1206', 1208', 1210', 1212' and rows 1214, 1216, 1218', 1220', and 1222'. The primes indicating that entries in the row or column have been modified from table 1200. Table 1200' is a modified table 1200 wherein various entries in the table with respect to CPE devices 2, 3, 4 have been changed to illustrate another example. In the example shown in FIG. 13 table 1200' CPE device 4 now supports a no-PDCCH mode of operation (row 1222', column 1204' entry). CPE device 3 has a current downlink channel utilization rate of 91% (row 1220', column 1210') and the amount of time the CPE device downlink channel utilization rate has been above the 90% threshold has been for 3.5 hrs (row 1220', column 1212' entry) which means the CPE device 2 has met and maintained the first condition requirements for 1.5 hrs. In this example, the wireless base station has synchronized the requests and/or instructions for the CPE devices to enter the no-PDCCH mode of operation. As a result, CPE device 1, CPE device 2, CPE device 3, CPE device 4 have all been entered in the no-PDCCH mode of operation concurrently. This is reflected in the amount of time until switch back to PDCCH mode of operation is 5 minutes for each of the CPE devices (i.e., CPE device 1, CPE device 2, CPE device 3, and CPE device 4) as shown in column 1208' of table 1200'. This eliminates the wireless base station operating in different modes of operation for different CPE devices as in this example the wireless base station is operating in the no PDCCH mode of operation for all CPE devices it is servicing and the amount time until the wireless base station switches from the no PDCCH mode of operation (referred to as second wireless base station mode of operation in connection with method 2000) until it switches to the PDCCH mode of operation (referred to as the first wireless base station mode of operation in connection with method 2000) is the same 5 minutes. In this example, as a result the wireless base station can cease generating and sending all PDCCH downlink control information to the CPE devices freeing up the entire PDCCH channel spectrum/bandwidth for use in communicating user data to the CPE devices. Even when the wireless base station synchronizes a lesser number of CPE devices mode of operation together advantages can still be achieved in that tracking for the time to switch modes can be synchronized.

In some embodiments, such as the ones discussed in connection with FIGS. 12 and 13 it has been assumed that the amount of bandwidth or spectrum (e.g., physical resource blocks) allocated to the downlink channels (PDCCH and PDSCH) of the CPE device has remained constant so that changes in the downlink channel utilization rate are not a function of the wireless base station changing the allocation of the bandwidth or spectrum for the downlink channels of the CPE device. In various embodiments, the wireless base station upon detecting that the downlink channel utilization rate has exceeded a first threshold value, e.g., 90% threshold value, the wireless base station does not change the allocation of spectrum or bandwidth to the channel until such time that it no longer exceeds the first threshold value, e.g., drops below 90%, or drops below a second threshold value, e.g., 60%. In this way, the amount of time that the downlink channel utilization rate is above the first threshold is a consistent measurement that is unaffected by changes in the allocation of bandwidth or spectrum to the downlink channel. This allows the wireless base station to change its bandwidth or spectrum channel allocation for a CPE device and then once a high utilization has been identified the wireless base station locks in the spectrum allocation for the channel. If over a predetermined continuous amount of time, e.g., two hours, the downlink utilization rate for the CPE device remains over the first threshold, the wireless base station is able to determine that amount of spectrum allocated for the downlink channel may remain fixed and the wireless base station and the CPE device may be placed in no PDCCH mode of operation.

In some embodiments, the wireless base station determines or calculates the downlink channel utilization as including the PDCCH+PDSCH utilization for a CPE device.

For example, one downlink channel for CPE device 1 consists of the PDCCH+PDSCH channels for CPE device 1. In this example, 100 physical resource blocks (PRBs) are allocated as being available for the downlink channel in total with 20% of the downlink resources being assigned to the PDCCH channel for the CPE device 1 and 80% being assigned for the PDSCH channel. This can be expressed as downlink channel (max 100 physical resource blocks) =PDCCH (max 20 PRBs)+PDSCH (max 80 PRBs) which are the available resources for downlink communications from the wireless base station to the CPE device 1. Out of these available resources, the wireless base station determines or calculates the amount of these resources which are being utilized. If 10 PRBs out of the total 20 PRBs available for PDCCH use are used for PDCCH downlink transmissions, e.g., downlink control signals and/or information transmissions, then the PDCCH utilization rate is 50%. This is a downlink channel utilization rate which does not correspond to the transmission of user data but instead channel control information. If 20 PRBs out of the 80 PRBs available for PDSCH use are used for PDSCH downlink transmissions (e.g., downlink user data transmissions) then the PDSCH utilization rate is 25%. This 25% downlink channel utilization rate does correspond to the transmission of user data.

In the normal PDCCH mode of operation also referred to as the first wireless base station mode of operation and first CPE device mode of operation, the PDSCH and PDCCH channels are isolated and/or separate channels which are allocated or assigned a number of PRBs by the wireless base station and their utilization rates are also calculated separately as the PDCCH channel is used for communicating downlink control information and the PDSCH channel is used for communicating user data.

When the no PDCCH mode of operation is in effect, the 20 PRBs allocated to the PDCCH channel are available to be utilized for sending user data. The downlink data utilization rate for communicating data, e.g., user data, from the wireless base station to CPE device 1 now includes the PDCCH utilization rate+the PDSCH utilization rate. The downlink data (i.e., user data) utilization rate would be (the number of PRBs used for transmitting user data to the CPE device 1 of the 20 PRBs available for the PDCCH+the number of PRBs used for transmitting user data to the CPE device 1 of the 80 PRBs available for the PDSCH) divided by 100 PRBs (the total number of PRBs allocated to the CPE device 1 (20 PRBs for PDCCH)+80 PRBs for PDSCH)) times 100%. For example, if 15 out of the 20 PRBs for PDCCH are used for user data and 80 out of the 80 PRBs for the PDSCH are used for user data then downlink data utilization rate is (95/100)*100%=95%. This example illustrates how the invention increases the efficiency of spectrum utilized in communicating with CPE devices to provide additional spectrum for communicating downlink user data to a CPE device.

The advantages of the various embodiments of the present invention in managing downlink channels and/or bandwidth and/or spectrum for communicating user data and downlink control information to CPE devices being serviced by a wireless base station is readily apparent from the following example. In this example, the wireless base station is providing servicing 4 CPE devices. CPE device 1 in turn is providing services via Wi-Fi connections to 100 user equipment devices, CPE device 2 is providing services via Wi-Fi connections to 50 user equipment devices, and CPE device 3 is providing services via Wi-Fi connection to 50 user equipment devices, and CPE device 4 is providing services via Wi-Fi connection to 100 user equipment devices. Because of the large number of user equipment devices each of the 4 CPE devices is servicing the connections between the CPE devices and the wireless base station are almost always active. In this example, the user devices are all requesting and receiving services and the wireless base station. The PDSCH channel used for communicating with the four CPE devices has a total of 300 physical resource blocks. The wireless base station allocates 100 PRBs to the CPE device 1, 50 PRBs to CPE device 2, 50 PRBs to CPE device 3 and 100 PRBs to CPE device 4. The wireless base station has 100 PRBs allocated for use in the PDCCH and allocates 25 PRBs to each of the four CPE devices for communicating downlink control information to the CPE devices. In this example, because the CPE devices each have a large number of users, the downlink utilization rate for the PDSCH channel for each of the CPE devices is 100%. That is the maximum number of PDSCH PRBs allocated to each CPE device is being utilized. The PRB PDSCH allocation to CPE devices remains constant throughout the example. The available bandwidth for communicating downlink user data to CPE devices is at its maximum. After the wireless base station detects that the CPE devices downlink utilization rate for the PDSCH has remained above a first threshold, e.g., 90% for a continuous period of time, e.g., 120 minutes, then the wireless base station will make a determination that it will be efficient to maintain the location of the user data being communication to each of the four CPE devices for a period of time (e.g., 10 minutes) and switch to the no PDCCH mode of operation. Once in the no PDCCH mode of operation for the four CPE devices, the PDCCH 100 PRBs are utilized for communicating user data to the CPE devices instead of downlink control information. This increases the amount of user data which can be communicated to the CPE devices by 100 PRBs which is equivalent to a ⅓ increase for the 10 minute period in which the wireless base station and four CPE devices are operating in the no PDCCH mode of operation. As the PRB PDSCH allocation is not changing during this 10 time period the location of the user data for each CPE device is also does not need to change and therefore there is no need to send the downlink control information. Hence it can be re-purposed. If the wireless base station determines there is a need to switch back to the PDCCH mode of operation prior to the expiration of the 10 minutes, the wireless base station can send a data pattern in the user data to one or more of the CPE devices indicating to the CPE device to switch back to the PDCCH mode of operation in which the CPE device can be sent downlink control information.

Diagram 1400 of FIG. 14 illustrates an exemplary data pattern in accordance with one embodiment of the present invention. The data pattern is a sixteen bit data pattern having the value 0111111111111101. It is to be understood that this data pattern is simplified for explanatory purposes. Other data patterns that may be, and sometimes are, used will be much longer or shorter than the sixteen bit data pattern shown in FIG. 14. In some embodiments, the data pattern may be sent at a specific position or location in the downlink data communicated to the CPE device such as for example at the start of a physical control block. In such instances, the position or location of the data pattern in the downlink data is communicated to the CPE device for example when the data pattern is communicated to the CPE device, e.g., in the PDCCH downlink control information sent to the CPE device.

Various exemplary embodiments illustrating different features of the present invention will now be discussed.

List of Set of Exemplary Numbered Method Embodiments

Method Embodiment 1. A wireless communications method comprising: monitoring, by a wireless base station, a downlink channel utilization rate of data transmissions from the wireless base station to a first customer premises equipment (CPE) device on a downlink shared channel to detect a first condition; and upon detecting, by the wireless base station, that the first condition exists, switching from operating in a first wireless base station mode of operation to operating in a second wireless base station mode of operation, said switching from operating in a first wireless base station mode of operation to operating in a second wireless base station mode of operation including switching from using a downlink control channel for transmitting downlink control information to the first customer premises equipment device to using the downlink control channel for transmitting user data.

Method Embodiment 1A. The wireless communications method of method embodiment 1, wherein the wireless base station only directly wirelessly connects to CPE devices located at customer premises in fixed locations and not to mobile terminals.

Method Embodiment 1AA. The wireless communications method of method embodiment 1, wherein said data transmission is the transmission of user data.

Method Embodiment 2. The wireless communications method of method embodiment 1, wherein said detecting, by the wireless base station, that the first condition exists includes determining that downlink channel utilization rate of data transmissions from the wireless base station to the first CPE device exceeds a first threshold value for a predetermined continuous time interval (e.g., 300 minutes).

Method Embodiment 2A. The wireless communications method of method embodiment 2, wherein the wireless base station has allocated the same amount of spectrum (e.g., channel capacity, physical resource blocks, bandwidth) of the downlink shared channel for use in transmitting user data from the wireless base station to the first CPE device (e.g., allocating 90 physical resource blocks for use in communicating user data to the first CPE device), for the duration of the predetermined continuous time interval.

Method Embodiment 3. The wireless communications method of method embodiment 1, wherein said downlink shared channel is a physical downlink shared channel used for communicating data from the wireless base station to a plurality of customer premises equipment devices to which the wireless base station is providing services, said first customer premises equipment device being one of said plurality of customer premises equipment devices.

Method Embodiment 4. The wireless communications method of method embodiment 3, wherein said downlink control channel is a physical downlink control channel used for communicating customer premises equipment downlink control information from the wireless base station to the plurality of customer premises equipment devices when said first wireless base station is operating in the first wireless base station mode of operation with respect to the plurality of customer premises equipment devices, said physical downlink control channel being a separate physical channel from the physical downlink shared channel.

Method Embodiment 5. The wireless communications method of method embodiment 4, wherein said customer premises equipment downlink control information includes a set of customer premises equipment device data location assignments, each customer premises equipment device data location assignment providing location information for a different customer premises equipment device that identifies where in the physical downlink shared channel data communicated from the wireless base station to that particular customer premises equipment device is located.

Method Embodiment 5A. The wireless communications method of method embodiment 5, wherein the location information includes a time and a frequency for each CPE device being serviced by the wireless base station identifying where the data (e.g., user data) for the CPE device can be located in the physical downlink shared channel.

Method Embodiment 6. The wireless communications method of method embodiment 5, wherein said wireless base station is a Citizens Broadband Radio Service tower base station; wherein said plurality of customer premises equipment devices includes the first customer premises equipment device, said first customer premises equipment device being located at a first customer premises and providing services to a first plurality of user equipment devices located at the first customer premises; wherein said first plurality of user equipment devices are Wi-Fi devices; and wherein said first customer premises equipment device includes a first communications interface for communicating with the wireless base station and a second communications interface for communicating with the first plurality of user equipment devices.

Method Embodiment 7. The wireless communications method of method embodiment 1 further comprising: prior to the wireless base station switching to the second wireless base station mode of operation, communicating from the wireless base station to the first CPE device a first amount of time during which the first CPE device is not to search for downlink control information directed to the first CPE device in the downlink control channel.

Method Embodiment 8. The wireless communications method of method embodiment 7 further comprising: prior to the wireless base station switching to the second wireless base station mode of operation, communicating from the wireless base station to the first CPE device location information identifying a fixed location in the downlink shared channel where data communicated from the wireless base station to the first CPE device will be located.

Method Embodiment 8A. The communications method of method embodiment 8, wherein said location information identifying a fixed location in the downlink shared channel where data communicated from the wireless base station to the first CPE device will be located includes time and frequency information mapping to a location in the downlink shared channel for communicating data to the first CPE device.

Method Embodiment 8B. The communications method of method embodiment 8A, wherein said wireless base station is a Citizens Broadband Radio Service Device; wherein said plurality of customer premises equipment devices includes the first customer premises equipment device, said first customer premises equipment device being located at a first customer premises and providing services to a first plurality of user equipment devices located at the first customer premises; wherein said first plurality of user equipment devices are Wi-Fi devices; and wherein said first customer premises equipment device includes a first communications interface for communicating with the wireless base station and a second communications interface for communicating with the first plurality of user equipment devices; and wherein the data communicated from the wireless base station to the first CPE device is user data for the one or more of the user equipment devices to which the first CPE device is providing services.

Method Embodiment 9. The wireless communications method of method embodiment 7 further comprising: operating by the wireless base station a timer; and when the timer indicates that first amount of time has passed since the wireless base station switched from operating in the first wireless base station mode of operation to operating in the second wireless base station mode of operation, switching by the wireless base station from operating in the second wireless base station mode of operation to operating in first wireless base station mode of operation, said switching from operating in a second wireless base station mode of operation to operating in the first wireless base station mode of operation including switching to using the downlink control channel for transmitting downlink control information to the first customer premises equipment device from the downlink control channel being used to transmit user data.

Method Embodiment 10. The wireless communications method of method embodiment 8 further comprising: prior to the wireless base station switching to the second wireless base station mode of operation, communicating from the wireless base station to the first CPE device a data bit pattern indicating that the first CPE device is to commence searching for downlink control information directed to the first CPE device in the downlink control channel when said first CPE device detects the data pattern in user data received from the wireless base station.

Method Embodiment 11. The wireless communications method of method embodiment 10 further comprising: monitoring, by the wireless base station, while operating in the second wireless base station mode of operation to detect a second condition; and upon detecting the second condition exists: (i) communicating, by the wireless base station, to the first CPE device the data pattern indicating that the first CPE device is to commence searching for downlink control information directed to the first CPE device in the downlink control channel; and (ii) switching by the wireless base station from operating in the second wireless base station mode of operation to operating in the first wireless base station mode of operation, said switching from operating in a second wireless base station mode of operation to operating in the first wireless base station mode of operation including switching to using the downlink control channel for transmitting downlink control information to the first customer premises equipment device from the downlink control channel being used to transmit user data.

List of Set of Exemplary Numbered Apparatus Embodiments

System Embodiment 1. A wireless communications system comprising: a wireless base station, said wireless base station including: a memory; and a processor, said processor controlling the wireless base station to perform the following operations: monitor a downlink channel utilization rate of data transmissions from the wireless base station to a first customer premises equipment (CPE) device on a downlink shared channel to detect a first condition; and upon detecting that the first condition exists, switching from operating in a first wireless base station mode of operation to operating in a second wireless base station mode of operation, said switching from operating in a first wireless base station mode of operation to operating in a second wireless base station mode of operation including switching from using a downlink control channel for transmitting downlink control information to the first customer premises equipment device to using the downlink control channel for transmitting user data.

System Embodiment 1A. The wireless communications system of system embodiment 1, wherein the wireless base station only directly wirelessly connects to CPE devices located at customer premises in fixed locations and not to mobile terminals (e.g., the wireless base station does not directly provide services to mobile terminals).

System Embodiment 1AA. The wireless communications system of system embodiment 1, wherein said data transmission is the transmission of user data.

System Embodiment 2. The wireless communications system of system embodiment 1, wherein said detecting, by the wireless base station, that the first condition exists includes determining that downlink channel utilization rate of data transmission from the wireless base station to the first CPE device exceeds a first threshold value for a predetermined continuous time interval (e.g., 240 minutes).

System Embodiment 2A. The wireless communications system of system embodiment 2, wherein the wireless base station has allocated the same amount of spectrum (e.g., channel capacity, physical resource blocks, bandwidth) of the downlink shared channel for use in transmitting user data from the wireless base station to the first CPE device (e.g., allocating 90 physical resource blocks for use in communicating user data to the first CPE device), for the duration of the predetermined continuous time interval.

System Embodiment 3. The wireless communications system of system embodiment 1, wherein said downlink shared channel is a physical downlink shared channel used for communicating data from the wireless base station to a plurality of customer premises equipment devices to which the wireless base station is providing services, said first customer premises equipment device being one of said plurality of customer premises equipment devices.

System Embodiment 4. The wireless communications system of system embodiment 3, wherein said downlink control channel is a physical downlink control channel used for communicating customer premises equipment downlink control information from the wireless base station to the plurality of customer premises equipment devices when said first wireless base station is operating in the first wireless base station mode of operation with respect to the plurality of customer premises equipment devices, said physical downlink control channel being a separate physical channel from the physical downlink shared channel.

System Embodiment 5. The wireless communications system of system embodiment 4, wherein said customer premises equipment downlink control information includes a set of customer premises equipment device data location assignments, each customer premises equipment device data location assignment providing location information for a different customer premises equipment device that identifies where in the physical downlink shared channel data communicated from the wireless base station to that particular customer premises equipment device is located.

System Embodiment 5A. The wireless communications system of system embodiment 5, wherein the location information includes a time and a frequency for each CPE device being serviced by the wireless base station identifying where the data (e.g., user data) for the CPE device can be located in the physical downlink shared channel.

System Embodiment 6. The wireless communications system of system embodiment 5, wherein said wireless base station is a Citizens Broadband Radio Service tower base station; wherein said plurality of customer premises equipment devices includes the first customer premises equipment device, said first customer premises equipment device being located at a first customer premises and providing services to a first plurality of user equipment devices located at the first customer premises; wherein said first plurality of user equipment devices are Wi-Fi devices; and wherein said first customer premises equipment device includes a first communications interface for communicating with the wireless base station and a second communications interface for communicating with the first plurality of user equipment devices.

System Embodiment 7. The wireless communications system of system embodiment 1, wherein the processor further controls the wireless base station to perform the operations of: prior to the wireless base station switching to the second wireless base station mode of operation, communicate from the wireless base station to the first CPE device a first amount of time during which the first CPE device is not to search for downlink control information directed to the first CPE device in the downlink control channel.

System Embodiment 8. The wireless communications systems of system embodiment 7, wherein the processor further controls the wireless base station to perform the operations of: prior to the wireless base station switching to the second wireless base station mode of operation, communicate from the wireless base station to the first CPE device location information identifying a fixed location in the downlink shared channel where data communicated from the wireless base station to the first CPE device will be located.

System Embodiment 8A. The communications system of system embodiment 8, wherein said location information identifying a fixed location in the downlink shared channel where data communicated from the wireless base station to the first CPE device will be located includes time and frequency information mapping to a location in the downlink shared channel for communicating data to the first CPE device.

System Embodiment 8B. The communications system of system embodiment 8A, wherein said wireless base station is a Citizens Broadband Radio Service Device; wherein said plurality of customer premises equipment devices includes the first customer premises equipment device, said first customer premises equipment device being located at a first customer premises and providing services to a first plurality of user equipment devices located at the first customer premises; wherein said first plurality of user equipment devices are Wi-Fi devices; and wherein said first customer premises equipment device includes a first communications interface for communicating with the wireless base station and a second communications interface for communicating with the first plurality of user equipment devices; and wherein the data communicated from the wireless base station to the first CPE device is user data for the one or more of the user equipment devices to which the first CPE device is providing services.

System Embodiment 9. The wireless communications system of system embodiment 7, wherein the processor further controls the wireless base station to operate: a timer; and when the timer indicates that first amount of time has passed since the wireless base station switched from operating in the first wireless base station mode of operation to operating in the second wireless base station mode of operation, switch by the wireless base station from operating in the second wireless base station mode of operation to operating in first wireless base station mode of operation, said switching from operating in a second wireless base station mode of operation to operating in the first wireless base station mode of operation including switching to using the downlink control channel for transmitting downlink control information to the first customer premises equipment device from the downlink control channel being used to transmit user data.

System Embodiment 10. The wireless communications system of system embodiment 8, wherein the processor further controls the wireless base station to: prior to the wireless base station switching to the second wireless base station mode of operation, communicate from the wireless base station to the first CPE device a data bit pattern indicating that the first CPE device is to commence searching for downlink control information directed to the first CPE device in the downlink control channel when said first CPE device detects the data pattern in user data received from the wireless base station.

System Embodiment 11. The wireless communications system of system embodiment 10, wherein the processor further controls the wireless base station to: monitor to detect a second condition while operating in the second wireless base station mode of operation; and upon detecting the second condition exists: (i) communicate to the first CPE device the data pattern indicating that the first CPE device is to commence searching for downlink control information directed to the first CPE device in the downlink control channel; and (ii) switch from operating in the second wireless base station mode of operation to operating in the first wireless base station mode of operation, said switch from operating in a second wireless base station mode of operation to operating in the first wireless base station mode of operation including switching to using the downlink control channel for transmitting downlink control information to the first customer premises equipment device from the downlink control channel being used to transmit user data.

List of Set of Exemplary Numbered Non-Transitory Computer Readable Medium Embodiments Non-Transitory Computer Readable Medium Embodiment 1. A non-transitory computer readable medium including a first set of computer executable instructions which when executed by a processor of a wireless base station cause the wireless base station to perform the steps of: monitoring a downlink channel utilization rate of data transmissions from the wireless base station to a first customer premises equipment (CPE) device on a downlink shared channel to detect a first condition; and upon detecting that the first condition exists, switching from operating in a first wireless base station mode of operation to operating in a second wireless base station mode of operation, said switching from operating in a first wireless base station mode of operation to operating in a second wireless base station mode of operation including switching from using a downlink control channel for transmitting downlink control information to the first customer premises equipment device to using the downlink control channel for transmitting user data.

Non-Transitory Computer Readable Medium Embodiment 2. The non-transitory computer readable medium of embodiment 1, wherein said detecting, by the wireless base station, that the first condition exists includes determining that downlink channel utilization rate of data transmission from the wireless base station to the first CPE device exceeds a first threshold value for a predetermined continuous time interval (e.g., 240 minutes).

Non-Transitory Computer Readable Medium Embodiment 3. The non-transitory computer readable medium of non-transitory computer readable medium embodiment 1, wherein said downlink shared channel is a physical downlink shared channel used for communicating data from the wireless base station to a plurality of customer premises equipment devices to which the wireless base station is providing services, said first customer premises equipment device being one of said plurality of customer premises equipment devices.

Non-Transitory Computer Readable Medium Embodiment 4. The non-transitory computer readable medium of non-transitory computer readable medium embodiment 3, wherein said downlink control channel is a physical downlink control channel used for communicating customer premises equipment downlink control information from the wireless base station to the plurality of customer premises equipment devices when said first wireless base station is operating in the first wireless base station mode of operation with respect to the plurality of customer premises equipment devices, said physical downlink control channel being a separate physical channel from the physical downlink shared channel.

Non-Transitory Computer Readable Medium Embodiment 5. The non-transitory computer readable medium of non-transitory computer readable medium embodiment 4, wherein said customer premises equipment downlink control information includes a set of customer premises equipment device data location assignments, each customer premises equipment device data location assignment providing location information for a different customer premises equipment device that identifies where in the physical downlink shared channel data communicated from the wireless base station to that particular customer premises equipment device is located.

Non-Transitory Computer Readable Medium Embodiment 5A. The non-transitory computer readable medium of non-transitory computer readable medium embodiment 5, wherein the location information includes a time and a frequency for each CPE device being serviced by the wireless base station identifying where the data (e.g., user data) for the CPE device can be located in the physical downlink shared channel.

Non-Transitory Computer Readable Medium Embodiment 6. The non-transitory computer readable medium of non-transitory computer readable medium embodiment 5, wherein said wireless base station is a Citizens Broadband Radio Service tower base station; wherein said plurality of customer premises equipment devices includes the first customer premises equipment device, said first customer premises equipment device being located at a first customer premises and providing services to a first plurality of user equipment devices located at the first customer premises; wherein said first plurality of user equipment devices are Wi-Fi devices; and wherein said first customer premises equipment device includes a first communications interface for communicating with the wireless base station and a second communications interface for communicating with the first plurality of user equipment devices.

The techniques of various embodiments may be implemented using software, hardware and/or a combination of software and hardware. Various embodiments are directed to apparatus, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to methods, e.g., method of controlling and/or operating wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, wireless base stations, user equipment devices, Wi-Fi Access Points, CPE devices, CBSDs, CBRS tower base stations, CBRS CPE devices, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements are configured to perform the steps of the methods described as being performed by the wireless base stations, user equipment devices, Wi-Fi Access Points, CPE devices, CBSDs, CBRS tower base stations, CBRS CPE devices, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements, with a processor which includes a component corresponding to each of the steps of the various described methods performed by the device in which the processor is included. In some but not all embodiments a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or element, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless base stations, user equipment devices, Wi-Fi Access Points, CPE devices, CBSDs, CBRS tower base stations, CBRS CPE devices, SAS devices, user devices, subscriber devices, servers, nodes and/or element. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, user equipment devices, Wi-Fi Access Points, CPE devices, CBSDs, CBRS tower base stations, CBRS CPE devices, SAS devices, user devices, subscriber devices, servers, nodes and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A wireless communications method comprising:
operating a wireless base station in a first wireless base station mode of operation with respect to a first wireless device, said first wireless base station mode of operation with respect to the first wireless device including using, by the wireless base station, only a physical downlink shared channel for communicating user data from the wireless base station to the first wireless device and using, by the wireless base station, a physical downlink control channel for transmitting downlink control information from the wireless base station to the first wireless device;
monitoring, by the wireless base station while operating in said first wireless base station mode of operation with respect to the first wireless device, a downlink channel utilization rate of data transmissions from the wireless base station to the first wireless device on the physical downlink shared channel to detect a first condition;
upon detecting, by the wireless base station, that the first condition exists, switching, by the wireless base station, from operating in the first wireless base station mode of operation with respect to the first wireless device to operating in a second wireless base station mode of operation with respect to the first wireless device, said second wireless base station mode of operation with respect to the first wireless device including the wireless base station using the physical downlink shared channel for communicating user data from the wireless base station to the first wireless device and using the physical downlink control channel for transmitting user data to the first wireless device instead of downlink control information; and
prior to the wireless base station switching to the second wireless base station mode of operation with respect to the first wireless device, communicating from the wireless base station to the first wireless device location information identifying a fixed location in the physical downlink shared channel where data communicated from the wireless base station to the first wireless device will be located while said first wireless base station is operating in said second wireless base station mode of operation with respect to the first wireless device.

2. The wireless communications method of claim 1, wherein said detecting, by the wireless base station, that the first condition exists includes determining that the downlink channel utilization rate of data transmissions from the wireless base station to the first wireless device exceeds a first threshold value for a predetermined continuous time interval.

3. The wireless communications method of claim 1, wherein said physical downlink shared channel is used for communicating data from the wireless base station to wireless devices to which the wireless base station is providing services.

4. The wireless communications method of claim 3, wherein said physical downlink control channel is a separate physical channel from the physical downlink shared channel;
wherein said wireless base station can operate in different wireless base station modes of operations with respect to each of a plurality of wireless devices to which the wireless base station is providing services, said first wireless device being one of said plurality of wireless devices, said different wireless base station modes of operation including the first wireless base station mode of operation and the second wireless base station mode of operation; and
wherein said physical downlink control channel is used for communicating wireless device downlink control information from the wireless base station to each of the plurality of wireless devices to which the wireless base station is providing services when operating in said first wireless base station mode of operation with respect to that wireless device.

5. The wireless communications method of claim 4, wherein said wireless device downlink control information includes a set of wireless device data location assignments, each wireless device data location assignment providing location information for a different wireless device that identifies where in the physical downlink shared channel data communicated from the wireless base station to that particular wireless device is located.

6. The wireless communications method of claim 5, wherein said wireless base station is a Citizens Broadband Radio Service tower base station;
wherein said first wireless device provides services to a first plurality of user equipment devices;
wherein said first plurality of user equipment devices are Wi-Fi devices; and
wherein said first wireless device includes a first communications interface for communicating with the wireless base station and a second communications interface for communicating with the first plurality of user equipment devices.

7. The wireless communications method of claim 1, further comprising:
prior to the wireless base station switching to the second wireless base station mode of operation with respect to the first wireless device, communicating from the wireless base station to the first wireless device a first message, the first message requesting the first wireless device to switch from operating in a first wireless device mode of operation to operating in a second wireless device mode of operation, said second wireless device mode of operation being a mode of operation in which the physical downlink control channel is used for transmitting user data to the first wireless device instead of downlink control information.

8. The wireless communications method of claim 7, further comprising:
prior to the wireless base station switching to the second wireless base station mode of operation with respect to the first wireless device, receiving an acceptance response message from the first wireless device indicating an acceptance of the request to switch from operating in the first wireless device mode of operation to operating in the second wireless device mode of operation.

9. The wireless communications method of claim 1, further comprising:
prior to the wireless base station switching to the second wireless base station mode of operation with respect to the first wireless device, communicating from the wireless base station to the first wireless device a data bit pattern indicating that the first wireless device is to commence searching for downlink control information directed to the first wireless device in the physical downlink control channel when said first wireless device detects the data pattern in user data received from the wireless base station.

10. A wireless communications system comprising:
a wireless base station, said wireless base station including:
memory; and
a processor, said processor controlling the wireless base station to perform the following operations:
operating the wireless base station in a first wireless base station mode of operation with respect to a first wireless device, said first wireless base station mode of operation with respect to the first wireless device including using, by the wireless base station, only a physical downlink shared channel for communicating user data from the wireless base station to the first wireless device and using, by the wireless base station, a physical downlink control channel for transmitting downlink control information from the wireless base station to the first wireless device;
monitoring, by the wireless base station while operating in said first wireless base station mode of operation with respect to the first wireless device, a downlink channel utilization rate of data transmissions from the wireless base station to the first wireless device on the physical downlink shared channel to detect a first condition;
upon detecting, by the wireless base station, that the first condition exists, switching, by the wireless base station, from operating in the first wireless base station mode of operation with respect to the first wireless device to operating in a second wireless base station mode of operation with respect to the first wireless device, said second wireless base station mode of operation with respect to the first wireless device including the wireless base station using the physical downlink shared channel for communicating user data from the wireless base station to the first wireless device and using the physical downlink control channel for transmitting user data to the first wireless device instead of downlink control information; and
prior to the wireless base station switching to the second wireless base station mode of operation with respect to the first wireless device, communicating from the wireless base station to the first wireless device location information identifying a fixed location in the physical downlink shared channel where data communicated from the wireless base station to the first wireless device will be located while said first wireless base station is operating in said second wireless base station mode of operation with respect to the first wireless device.

11. The wireless communications system of claim 10, wherein said detecting, by the wireless base station, that the first condition exists includes determining that the downlink channel utilization rate of data transmissions from the wireless base station to the first wireless device exceeds a first threshold value for a predetermined continuous time interval.

12. The wireless communications system of claim 10, wherein said physical downlink shared channel is used for communicating data from the wireless base station to wireless devices to which the wireless base station is providing services.

13. The wireless communications system of claim 12, wherein said physical downlink control channel is a separate physical channel from the physical downlink shared channel;
wherein said wireless base station can operate in different wireless base station modes of operations with respect to each of a plurality of wireless devices to which the wireless base station is providing services, said first wireless base station being one of said plurality of wireless devices, said different wireless base station modes of operation including the first wireless base station mode of operation and the second wireless base station mode of operation; and
wherein said physical downlink control channel is used for communicating wireless device downlink control information from the wireless base station to each of the plurality of wireless devices to which it is providing services when operating in said first wireless base station mode of operation with respect to that wireless device.

14. The wireless communications system of claim 13, wherein said wireless device downlink control information includes a set of wireless device data location assignments, each wireless device data location assignment providing location information for a different wireless device that identifies where in the physical downlink shared channel data communicated from the wireless base station to that particular wireless device is located.

15. The wireless communications system of claim 14, wherein said wireless base station is a Citizens Broadband Radio Service tower base station;
wherein said first wireless device provides services to a first plurality of user equipment devices;
wherein said first plurality of user equipment devices are Wi-Fi devices; and
wherein said first wireless device includes a first communications interface for communicating with the wireless base station and a second communications interface for communicating with the first plurality of user equipment devices.

16. The wireless communications system of claim 10, wherein the processor further controls the wireless base station to perform the additional operation of:
prior to the wireless base station switching to the second wireless base station mode of operation with respect to the first wireless device, communicating from the wireless base station to the first wireless device a first message, the first message requesting the first wireless device to switch from operating in a first wireless device mode of operation to operating in a second wireless device mode of operation, said second wireless device mode of operation being a mode of operation in which the physical downlink control channel is used for transmitting user data to the first wireless device instead of downlink control information.

17. The wireless communications systems of claim 16, wherein the processor further controls the wireless base station to perform the additional operation of:
prior to the wireless base station switching to the second wireless base station mode of operation with respect to the first wireless device, receiving an acceptance response message from the first wireless device indicating an acceptance of the request to switch from operating in the first wireless device mode of operation to operating in the second wireless device mode of operation.

18. A non-transitory computer readable medium including a first set of computer executable instructions which when executed by a processor of a wireless base station cause the wireless base station to perform the steps of:
operating the wireless base station in a first wireless base station mode of operation with respect to a first wireless device, said first wireless base station mode of operation with respect to the first wireless device including using, by the wireless base station, only a physical downlink shared channel for communicating user data from the wireless base station to the first wireless device and using, by the wireless base station, a physical downlink control channel for transmitting downlink control information from the wireless base station to the first wireless device;
monitoring, by the wireless base station while operating in said first wireless base station mode of operation with respect to the first wireless device, a downlink channel utilization rate of data transmissions from the wireless base station to the first wireless device on the physical downlink shared channel to detect a first condition;
upon detecting, by the wireless base station, that the first condition exists, switching, by the wireless base station, from operating in the first wireless base station mode of operation with respect to the first wireless device to operating in a second wireless base station mode of operation with respect to the first wireless device, said second wireless base station mode of operation with respect to the first wireless device including the wireless base station using the physical downlink shared channel for communicating user data from the wireless base station to the first wireless device and using the physical downlink control channel for transmitting user data to the first wireless device instead of downlink control information; and
prior to the wireless base station switching to the second wireless base station mode of operation with respect to the first wireless device, communicating from the wireless base station to the first wireless device location information identifying a fixed location in the physical downlink shared channel where data communicated from the wireless base station to the first wireless device will be located while said first wireless base station is operating in said second wireless base station mode of operation with respect to the first wireless device.

19. A wireless communications method comprising:
operating a wireless base station in a first wireless base station mode of operation with respect to a first wireless device, said first wireless base station mode of operation with respect to the first wireless device including using, by the wireless base station, only a physical downlink shared channel for communicating user data from the wireless base station to the first wireless device and using, by the wireless base station, a physical downlink control channel for transmitting downlink control information from the wireless base station to the first wireless device;
monitoring, by the wireless base station, while operating in said first wireless base station mode of operation with respect to the first wireless device, a downlink channel utilization rate of data transmissions from the wireless base station to the first wireless device on the physical downlink shared channel to detect a first condition;
upon detecting, by the wireless base station, that the first condition exists, switching, by the wireless base station, from operating in the first wireless base station mode of operation with respect to the first wireless device to operating in a second wireless base station mode of operation with respect to the first wireless device, said second wireless base station mode of operation with respect to the first wireless device including the wireless base station using the physical downlink shared channel for communicating user data from the wireless base station to the first wireless device and using the physical downlink control channel for transmitting user data to the first wireless device instead of downlink control information; and
wherein said physical downlink control channel is used for communicating downlink control information from the wireless base station to a plurality of wireless devices to which the wireless base station is providing services when operating in the first wireless base station mode of operation with respect to the plurality of wireless devices, said downlink control information including a set of wireless device data location assignments, each wireless device data location assignment providing location information for a different wireless device of the plurality of wireless devices to which the wireless base station is providing services that identifies, where in the physical downlink shared channel, data communicated from the wireless base station to that particular wireless device is located, said first wireless device being one of said plurality of wireless devices.

20. A wireless communications system comprising:
a wireless base station, said wireless base station including:
memory; and
a processor, said processor controlling the wireless base station to perform the following operations:
operating the wireless base station in a first wireless base station mode of operation with respect to a first wireless device, said first wireless base station mode of operation with respect to the first wireless device including using, by the wireless base station, only a physical downlink shared channel for communicating user data from the wireless base station to the first wireless device and using, by the wireless base station, a physical downlink control channel for transmitting downlink control information from the wireless base station to the first wireless device;

monitoring, by the wireless base station, while operating in said first wireless base station mode of operation with respect to the first wireless device, a downlink channel utilization rate of data transmissions from the wireless base station to the first wireless device on the physical downlink shared channel to detect a first condition;

upon detecting, by the wireless base station, that the first condition exists, switching, by the wireless base station from operating in the first wireless base station mode of operation with respect to the first wireless device to operating in a second wireless base station mode of operation with respect to the first wireless device, said second wireless base station mode of operation with respect to the first wireless device including the wireless base station using the physical downlink shared channel for communicating user data from the wireless base station to the first wireless device and using the physical downlink control channel for transmitting user data to the first wireless device instead of downlink control information; and wherein said physical downlink control channel is used for communicating downlink control information from the wireless base station to a plurality of wireless devices to which the wireless base station is providing services when operating in the first wireless base station mode of operation with respect to the plurality of wireless devices, said downlink control information including a set of wireless device data location assignments, each wireless device data location assignment providing location information for a different wireless device of the plurality of wireless devices to which the wireless base station is providing services that identifies, where in the physical downlink shared channel, data communicated from the wireless base station to that particular wireless device is located, said first wireless device being one of said plurality of wireless devices.

* * * * *